United States Patent
Hayashi et al.

(10) Patent No.: US 10,339,638 B2
(45) Date of Patent: Jul. 2, 2019

(54) IMAGE PROCESSING DEVICE, IMAGING DEVICE, IMAGE PROCESSING METHOD, AND IMAGE PROCESSING PROGRAM

(71) Applicant: FUJIFILM Corporation, Tokyo (JP)

(72) Inventors: Kenkichi Hayashi, Saitama (JP); Junichi Tanaka, Saitama (JP); Yousuke Naruse, Saitama (JP); Masahiko Sugimoto, Saitama (JP); Kousuke Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 81 days.

(21) Appl. No.: 15/789,710

(22) Filed: Oct. 20, 2017

(65) Prior Publication Data
US 2018/0040109 A1    Feb. 8, 2018

Related U.S. Application Data

(63) Continuation of application No. PCT/JP2016/062172, filed on Apr. 15, 2016.

(30) Foreign Application Priority Data

Apr. 23, 2015  (JP) ................. 2015-088231

(51) Int. Cl.
*H04N 5/33* (2006.01)
*G06T 5/00* (2006.01)
*H04N 1/409* (2006.01)
*G02B 5/20* (2006.01)
*H04N 5/232* (2006.01)
*H04N 5/217* (2011.01)

(52) U.S. Cl.
CPC .............. *G06T 5/003* (2013.01); *G02B 5/208* (2013.01); *H04N 1/409* (2013.01); *H04N 5/217* (2013.01);
(Continued)

(58) Field of Classification Search
CPC ........ G06T 5/003; G02B 5/208; H04N 1/409; H04N 5/217; H04N 5/23212; H04N 5/23229; H04N 5/23245; H04N 5/332
(Continued)

(56) References Cited

U.S. PATENT DOCUMENTS

2003/0184663 A1  10/2003  Nakano et al.
2010/0245657 A1  9/2010  Adachi et al.
(Continued)

FOREIGN PATENT DOCUMENTS

JP   2002-300461 A   10/2002
JP   2008-113704 A   5/2008
(Continued)

OTHER PUBLICATIONS

International Preliminary Report on Patentability and Written Opinion of the International Searching Authority (forms PCT/IB/373, PCT/ISA/237 and PCT/IB/326), dated Nov. 2, 2017, for corresponding International Application No. PCT/JP2016/062172, with translation of the Written Opinion.
(Continued)

*Primary Examiner* — Nguyen T Truong
(74) *Attorney, Agent, or Firm* — Birch, Stewart, Kolasch & Birch, LLP

(57) ABSTRACT

An image processing device and an image processing method capable of satisfactorily performing a point image restoration process of a visible light image and a point image restoration process of a near-infrared light image are provided. A point image restoration process is performed on luminance data Y indicating a visible light image and IR data indicating a near-infrared light image using a first point image restoration filter based on a first point spread function with respect to visible light of an optical system and a second point image restoration filter based on a second point
(Continued)

spread function with respect to near-infrared light of the optical system. An appropriate point image restoration process is performed on the IR data so that restoration strength (second gain $\beta$) in the point image restoration process for the IR data captured with radiation of near-infrared light is higher than restoration strength (first gain $\alpha$) in the point image restoration process for the luminance data Y.

20 Claims, 15 Drawing Sheets

(52) U.S. Cl.
CPC ..... *H04N 5/23212* (2013.01); *H04N 5/23229* (2013.01); *H04N 5/23245* (2013.01); *H04N 5/332* (2013.01); *G06T 2207/10024* (2013.01); *G06T 2207/10048* (2013.01); *G06T 2207/20192* (2013.01)

(58) Field of Classification Search
USPC .......................................................... 348/164
See application file for complete search history.

(56) References Cited

U.S. PATENT DOCUMENTS

| | | |
|---|---|---|
| 2011/0199514 A1 | 8/2011 | Tamura |
| 2013/0050546 A1 | 2/2013 | Kano |
| 2013/0278726 A1 | 10/2013 | Muhammad et al. |
| 2016/0119560 A1 | 4/2016 | Hayashi et al. |

FOREIGN PATENT DOCUMENTS

| | | |
|---|---|---|
| JP | 2010-140442 A | 6/2010 |
| JP | 2010-230776 A | 10/2010 |
| JP | 2011-128238 A | 6/2011 |
| JP | 2013-51524 A | 3/2013 |
| JP | 2014-507856 A | 3/2014 |
| JP | 2014-64304 A | 4/2014 |
| WO | WO 2015/015966 A1 | 2/2015 |

OTHER PUBLICATIONS

International Search Report (form PCT/ISA/210), dated Jun. 7, 2016, for corresponding International Application No. PCT/JP2016/062172, with an English translation.

Japanese Decision to Grant a Patent, dated Nov. 7, 2017, for corresponding Japanese Application No. 2017-514102, with an English translation.

International Preliminary Report on Patentability and Written Opinion of the International Searching Authority (Forms PCT/IB/326, PCT/IB/373 and PCT/ISA/237) for International Application No. PCT/JP2016/062169, dated Nov. 2, 2017, with an English translation of the Written Opinion.

International Search Report (Form PCT/ISA/210) for International Application No. PCT/JP2016/062169, dated Jul. 12, 2016, with an English translation.

Japanese Decision to Grant a Patent for Japanese Application No. 2017-514099, dated Oct. 26, 2017, with an English translation.

U.S. Office Action, dated Feb. 14, 2019, for U.S. Appl. No. 15/789,015.

IMAGE PROCESSING DEVICE, IMAGING DEVICE, IMAGE PROCESSING METHOD, AND IMAGE PROCESSING PROGRAM

CROSS-REFERENCE TO RELATED APPLICATIONS

The present application is a Continuation of PCT International Application No. PCT/JP2016/062172 filed on Apr. 15, 2016 claiming priority under 35 U.S.C § 119(a) to Japanese Patent Application No. 2015-088231 filed on Apr. 23, 2015. Each of the above applications is hereby expressly incorporated by reference, in their entirety, into the present application.

BACKGROUND OF THE INVENTION

1. Field of the Invention

The present invention relates to an image processing device, an imaging device, an image processing method, and an image processing program, and more particularly, to a technology for performing a point image restoration process on the basis of a point spread function on a visible light image and a near-infrared light image.

2. Description of the Related Art

A point spread phenomenon in which a point subject has small spread due to an influence such as diffraction or aberration caused by an optical system may be observed in a subject image captured via the optical system. A function representing a response of the optical system to a point light source is called a point spread function (PSF) and is known as a property that affects resolution degradation (bokeh) of a captured image.

By performing a point image restoration process based on the PSF on a captured image of which image quality has been degraded due to the point spread phenomenon, it is possible to recover (restore) the degraded image quality of a captured image. This point image restoration process is a process of obtaining degradation characteristics (point image characteristics) caused by aberration or the like of a lens (optical system) in advance and canceling or reducing point spread of a captured image through image processing using a point image restoration filter according to the point image characteristics.

Incidentally, there is, for example, a surveillance camera as a camera having a day and night function capable of performing capturing of a visible light image in daytime and capturing of a near-infrared light image in nighttime. In the surveillance camera having the day and night function, an infrared cut filter is inserted into an imaging optical path of a lens and imaging (color imaging) is performed with sensitivity only to visible light in daytime, whereas the infrared cut filter is retracted from the imaging optical path, near-infrared light is emitted (lights up) as auxiliary light, and imaging (black and white imaging) is performed with sensitivity to a wavelength band from visible light to near-infrared light in nighttime.

In a case where the point image restoration process is applied to a visible light image and a near-infrared light image captured by the surveillance camera having the day and night function, there is a problem in that the point image restoration process for at least one of the visible light image and the near-infrared light image cannot be satisfactorily performed in a case where the same point image restoration filter is used since aberration of the lens is different between the visible light and the near-infrared light.

JP2008-113704A describes a biometric authentication device that performs a plurality of authentications such as fingerprint authentication, vein authentication, and iris authentication. This biometric authentication device uses a depth of field extension optical system including an optical wavefront modulation element, radiates ultraviolet light suitable for emphasizing visible light or a fingerprint in fingerprint imaging at the time of fingerprint authentication, radiates infrared light suitable for emphasizing a blood vessel while passing through a skin in vein imaging at the time of vein authentication, and radiates visible light or infrared light in iris imaging at the time of iris authentication. Using the optical wavefront modulation element, a dispersed image is restored into an image with no dispersion through convolution (convolution calculation) between the dispersed image (bokeh image) in which an optical image has been dispersed and a conversion coefficient corresponding to dispersion caused by the optical wavefront modulation element. In this restoration process, the conversion coefficient corresponding to the dispersion caused by the optical wavefront modulation element is changed according to a wavelength of light with which an imaging target (a fingerprint, a vein, or an iris) is irradiated.

JP2011-128238A describes an imaging device that inserts an infrared cut filter into an optical system to perform imaging in a visible light camera imaging mode, retracts the infrared cut filter from the optical system to perform imaging in a dark imaging mode and a biometric authentication mode, selects a first inverse function for performing image reproduction for proximity imaging to perform an image filtering process based on the first inverse function in the biometric authentication mode, and selects a second inverse function for performing image reproduction for distant imaging to perform an image filtering process based on the second inverse function in the visible light camera imaging mode and the dark imaging mode.

JP2014-064304A describes that an optical element such as a low pass filter or an infrared cut filter may be put in an optical system, but in a case where an element affecting characteristics of an optical transfer function (OTF) of the low pass filter or the like is used, it is necessary to take into consideration in a case where a point image restoration filter is generated.

SUMMARY OF THE INVENTION

In a case where the point image restoration process is applied to a visible light image and a near-infrared light image captured by the surveillance camera having the day and night function, since aberration of the lens is different between the visible light and the near-infrared light, it is preferable to switch between a point image restoration filter for visible light that is used for a point image restoration process of the visible light image and a point image restoration filter for near-infrared light that is used for a point image restoration process of the near-infrared light image.

JP2008-113704A describes changing a conversion coefficient corresponding to dispersion caused by an optical wavefront modulation element according to a wavelength of light for irradiation in a case where each of dispersed images of a visible light image and a near-infrared light image captured using a depth of field extension optical system having an optical wavefront modulation element is restored, but does not describe restoration strength in a case where a point image restoration process is performed on a visible light image and a near-infrared light image.

Here, the restoration strength refers to strength for restoring an image degraded due to imaging into an original image without degradation. A point image restoration process approaching the original image is performed as the restoration strength is higher. In a case where the point image restoration process with high restoration strength is performed on a degraded image, a low signal-to-noise ratio (S/N ratio) of the degraded image leads to overcorrection in which artifacts are generated and rather causes an adverse effect such as degradation of image quality. On the other hand, in a case where the point image restoration process with low restoration strength is performed, the above adverse effect can be avoided, but there is a problem in that sufficient point image restoration is not performed and blurs remain.

In the invention described in JP2011-128238A, the image filtering process based on the first inverse function and the image filtering process based on the second inverse function are switched in the biometric authentication mode (a mode in which proximity imaging is performed) and the visible light camera imaging mode and the dark imaging mode (a mode in which distant imaging is performed), and the image filtering process based on the first inverse function and the image filtering process based on the second inverse function are not switched in the visible light camera imaging mode in which capturing of a visible light image is performed and the dark imaging mode and the biometric authentication mode in which capturing of a near-infrared light image is performed. A technology for selecting an inverse function (point image restoration filter) used for the image filtering process according to a subject distance is a known technology. Further, JP2011-128238A does not describe restoration strength of the filtering process (point image restoration process) based on the first inverse function or the second inverse function.

JP2014-064304A describes that it is necessary to take into consideration in a case where a point image restoration filter is generated in a case where an element (such as an infrared cut filter) affecting characteristics of an OTF of the optical system is put in the optical system, but does not describe that an infrared cut filter is puts in and from an optical system even though, does not describe generating a separate point image restoration filter in a case where the infrared cut filter is inserted into the optical system and a case where the infrared cut filter is retracted from the optical system, and does not describe restoration strength of the point image restoration process.

The present invention has been made in view of such circumstances, and an object of the present invention is to provide an image processing device, an imaging device, an image processing method, and an image processing program capable of satisfactorily performing a point image restoration process of a visible light image and a point image restoration process of a near-infrared light image.

In order to achieve the above object, according to an aspect of the present invention, there is provided an image processing device comprising an image acquisition unit that acquires first image data indicating a visible light image captured with sensitivity to a visible light wavelength band using an optical system, and second image data including a near-infrared light image captured with sensitivity to the visible light wavelength band and a near-infrared light wavelength band using the optical system; a first point image restoration processing unit that performs a first point image restoration process on the acquired first image data using a first point image restoration filter based on a first point spread function with respect to visible light of the optical system; and a second point image restoration processing unit that performs a second point image restoration process on the acquired second image data using a second point image restoration filter based on a second point spread function with respect to near-infrared light of the optical system, the second point image restoration processing unit causing restoration strength in the second point image restoration process for the second image data captured with radiation of near-infrared light to be higher than restoration strength in the first point image restoration process performed by the first point image restoration processing unit.

According to the aspect of the present invention, since the point image restoration process is performed on the first image data indicating the visible light image and the second image data including the near-infrared light image using the first point image restoration filter (first point image restoration filter for visible light) based on the first point spread function for the visible light of the optical system and the second point image restoration filter (second point image restoration filter for near-infrared light) based on the second point spread function for the near-infrared light of the optical system, it is possible to satisfactorily perform the point image restoration process on the first image data and the second image data and, particularly, the restoration strength in the second point image restoration process for the second image data captured with radiation of the near-infrared light is made higher than the restoration strength in the first point image restoration processing unit. Since an S/N ratio of the second image data captured with radiation of the near-infrared light is made high due to the radiation of the near-infrared light, overcorrection is not performed even in a case where the restoration strength in the second point image restoration process for the second image data is high, and the near-infrared light image degraded due to imaging can be restored into high image quality near-infrared light image.

According to another aspect of the present invention, there is provided an image processing device comprising an image acquisition unit that acquires first image data captured using an optical system in which an infrared cut filter has been inserted into an imaging optical path, and second image data captured using the optical system in which the infrared cut filter has been retracted from the imaging optical path; a first point image restoration processing unit that performs a first point image restoration process on the acquired first image data using a first point image restoration filter based on a first point spread function with respect to visible light of the optical system; and a second point image restoration processing unit that performs a second point image restoration process on the acquired second image data using a second point image restoration filter based on a second point spread function with respect to near-infrared light of the optical system, the second point image restoration processing unit causing restoration strength in the second point image restoration process for the second image data captured with radiation of near-infrared light to be higher than restoration strength in the first point image restoration process performed by the first point image restoration processing unit.

In the image processing device according to the aspects of the present invention, it is preferable for the second point image restoration processing unit to cause the restoration strength in the second point image restoration process for the second image data captured without radiation of near-infrared light to be lower than the restoration strength in the first point image restoration process for the first image data that is performed by the first point image restoration processing unit.

Since the S/N ratio of the second image data captured without radiation of the near-infrared light is low, high restoration strength in the second point image restoration process for the second image data leads to overcorrection and rather causes degradation of image quality. Therefore, according to the aspects of the present invention, in the case of the second image data captured without radiation of the near-infrared light, the restoration rate in the second point image restoration process for the second image data is made small to prevent degradation of image quality due to overcorrection.

In the image processing device according to the aspects of the present invention, it is preferable that the image processing device further comprises: a discrimination unit that discriminates whether or not the acquired second image data is the second image data that has been captured without radiation of the near-infrared light from the near-infrared light emitting unit and captured under a light source in which visible light and near-infrared light coexist, wherein in a case where the discrimination unit discriminates that the acquired second image data is the second image data that has been captured without radiation of the near-infrared light and includes a visible light component and a near-infrared light component, the second point image restoration processing unit causes the restoration strength in the second point image restoration process to be higher than the restoration strength in the second point image restoration process for the second image data captured without radiation of the near-infrared light and not including a visible light component.

There is time when visible light and near-infrared light coexist at the time of switching from daytime to nighttime (twilight state) or switching from nighttime to daytime (dawn state). In this twilight or dawn state, the second image data captured without radiation of the near-infrared light from the near-infrared light emitting unit includes a visible light component and a near-infrared light component. Since the second image data including the visible light component and the near-infrared light component is brighter than the second image data captured without radiation of the near-infrared light as in nighttime and not including the visible light component (image data including only the near-infrared light component), an S/N ratio is high. Therefore, the restoration strength in the second point image restoration process for the second image data including the visible light component and the near-infrared light component is made higher than the restoration strength in the second point image restoration process for the second image data including only the near-infrared light component. In this case, for the second image data including the visible light component and the near-infrared light component, overcorrection is not performed even in a case where the restoration strength in the second point image restoration process for the second image data is high, and the near-infrared light image degraded due to imaging can be restored into high image quality near-infrared light image.

In the image processing device according to the aspects of the present invention, it is preferable that the second point image restoration processing unit includes a restoration rate control unit that adjusts a restoration rate of the second image data in the second point image restoration process, and the restoration rate control unit causes a restoration rate of the second image data captured with radiation of near-infrared light to be higher than a restoration rate of the first image data in the first point image restoration process. This is because, since an S/N ratio of the second image data captured with radiation of the near-infrared light is made high due to the radiation of the near-infrared light, overcorrection is not performed even in a case where the restoration strength in the second point image restoration process for the second image data is high, and the near-infrared light image degraded due to imaging can be restored into high image quality near-infrared light image. It is possible to adjust the restoration rate of the second image data in the second point image restoration process using the restoration rate control unit, and to obtain a restoration rate having a desired magnitude in a case where the restoration rate of the second image data captured with radiation of the near-infrared light is made higher than the restoration rate of the first image data in the first point image restoration process.

In the image processing device according to the aspects of the present invention, it is preferable that the second point image restoration processing unit includes a restoration rate control unit that adjusts a restoration rate of the second image data in the second point image restoration process, and the restoration rate control unit causes a restoration rate of the second image data captured without radiation of near-infrared light to be smaller than a restoration rate of the first image data in the first point image restoration process.

Since the S/N ratio of the second image data captured without radiation of the near-infrared light is low, high restoration strength in the second point image restoration process for the second image data leads to overcorrection and rather causes degradation of image quality. Therefore, in the case of the second image data captured without radiation of the near-infrared light, the restoration rate of the second image data captured without radiation of the near-infrared light is made smaller than the restoration rate of the first image data in the first point image restoration process to prevent degradation of image quality due to overcorrection.

In the image processing device according to the aspects of the present invention, it is preferable that the first image data includes first color data, and second color data of two or more colors having a contribution rate for obtaining luminance data lower than that of the first color data, and the first point image restoration processing unit performs a first point image restoration process on luminance data generated from the first image data using the first point image restoration filter corresponding to the luminance data. Since the first point image restoration processing unit performs the first point image restoration process on the luminance data (luminance data with a large visual effect) generated from the first image data using the first point image restoration filter corresponding to the luminance data, a calculation load of the point image restoration process can be reduced as compared with the case where the point image restoration process is performed for each piece of color data of the first color data and the second color data of two or more colors.

In the image processing device according to the aspects of the present invention, it is preferable that the first image data includes first color data, and each of pieces of second color data of two or more colors having a contribution rate for obtaining luminance data lower than that of the first color data, and the first point image restoration processing unit performs a first point image restoration process on the first color data and each of pieces of the second color data of two or more colors using the first point image restoration filter corresponding to the first color data and each of pieces of second color data of two or more colors. Since the first point image restoration processing unit performs the first point image restoration process on the first color data and each of pieces of second color data of two or more colors using the first point image restoration filter corresponding to the first color data and each of pieces of second color data of two or more colors, it is possible to perform a high-precision point image restoration process and also perform correction of lateral chromatic aberration.

According to still another aspect of the present invention, there is provided an imaging device comprising the image processing device; and an optical system in which an infrared cut filter is insertable into an imaging optical path and retractable from the imaging optical path, wherein the image acquisition unit is an imaging unit that images a subject to acquire first image data indicating a visible light image of the subject using the optical system in which the infrared cut filter has been inserted into the imaging optical path and images the subject to acquire second image data indicating a near-infrared light image of the subject using the optical system in which the infrared cut filter has been retracted from the imaging optical path, and the imaging unit includes a focus adjustment unit that adjusts a focus position of the subject in the optical system, the focus adjustment unit adjusting the focus position for the subject imaged using the optical system in which the infrared cut filter has been inserted into the imaging optical path. In a case where the imaging device is, for example, a surveillance camera fixed at a fixed point, it is preferable for the focus adjustment unit to adjust the focus position with respect to the subject that is imaged (visible light imaging) using the optical system in which the infrared cut filter has been inserted into the imaging optical path. This is for capturing a focused visible light image with high image quality. In this case, a focus position of the subject that is imaged (infrared imaging) using the optical system in which the infrared cut filter has been retracted from the imaging optical path is shifted from the focus position adjusted by the focus adjustment unit according to retraction of the infrared cut filter or a difference in wavelength (chromatic aberration) (defocused state). The near-infrared light image captured in a defocused state as described above is blurred as compared with the visible light image. Therefore, the restoration strength in the second point image restoration process for the second image data indicating the near-infrared light image is increased in order to enhance a sharpness improvement effect of the near-infrared light image.

In the imaging device according to the aspects of the present invention, it is preferable that the imaging device further comprises: a near-infrared light emitting unit that emits near-infrared light as auxiliary light at the time of imaging of a near-infrared light image.

According to still another aspect of the present invention, there is provided an image processing method comprising a step of acquiring first image data indicating a visible light image captured with sensitivity to a visible light wavelength band using an optical system, and second image data including a near-infrared light image captured with sensitivity to the visible light wavelength band and a near-infrared light wavelength band using the optical system; a step of performing a first point image restoration process on the acquired first image data using a first point image restoration filter based on a first point spread function with respect to visible light of the optical system; and a step of performing a second point image restoration process on the acquired second image data using a second point image restoration filter based on a second point spread function with respect to near-infrared light of the optical system, the step including causing restoration strength in the second point image restoration process for the second image data captured with radiation of near-infrared light to be higher than restoration strength in the first point image restoration process.

In the image processing method according to the aspect of the present invention, it is preferable for the step of performing the second point image restoration process to include causing the restoration strength in the second point image restoration process for the second image data captured without radiation of near-infrared light to be lower than the restoration strength in the first point image restoration process for the first image data.

According to still another aspect of the present invention, there is provided an image processing program causing a computer to execute: a step of acquiring first image data indicating a visible light image captured with sensitivity to a visible light wavelength band using an optical system, and second image data including a near-infrared light image captured with sensitivity to the visible light wavelength band and a near-infrared light wavelength band using the optical system; a step of performing a first point image restoration process on the acquired first image data using a first point image restoration filter based on a first point spread function with respect to visible light of the optical system; and a step of performing a second point image restoration process on the acquired second image data using a second point image restoration filter based on a second point spread function with respect to near-infrared light of the optical system, the step including causing restoration strength in the second point image restoration process for the second image data captured with radiation of near-infrared light to be higher than restoration strength in the first point image restoration process.

In the image processing program according to the aspect of the present invention, it is preferable for the step of performing the second point image restoration process to include causing the restoration strength in the second point image restoration process for the second image data captured without radiation of near-infrared light to be lower than the restoration strength in the first point image restoration process for the first image data. A non-transitory computer-readable tangible medium having the image processing program recorded thereon is also included in still another aspect of the present invention.

According to the present invention, since the point image restoration process is performed on the first image data indicating the visible light image and the second image data including the near-infrared light image using the first point image restoration filter for visible light and the second point image restoration filter for near-infrared light, it is possible to satisfactorily perform the point image restoration process on the first image data and the second image data, and particularly, to restore a degraded near-infrared light image into a high image quality near-infrared light image by causing the restoration strength in the second point image restoration process for the second image data captured with radiation of the near-infrared light to be higher than the restoration strength in the first point image restoration processing unit.

DESCRIPTION OF THE PREFERRED EMBODIMENTS

Hereinafter, embodiments of an image processing device, an imaging device, an image processing method, and an image processing program according to the present invention will be described with reference to the accompanying drawings. In the following embodiments, a case where the present invention is applied to an imaging device that is used as a surveillance camera connectable to a computer (PC: Personal Computer) will be described by way of example.

Figure 1:
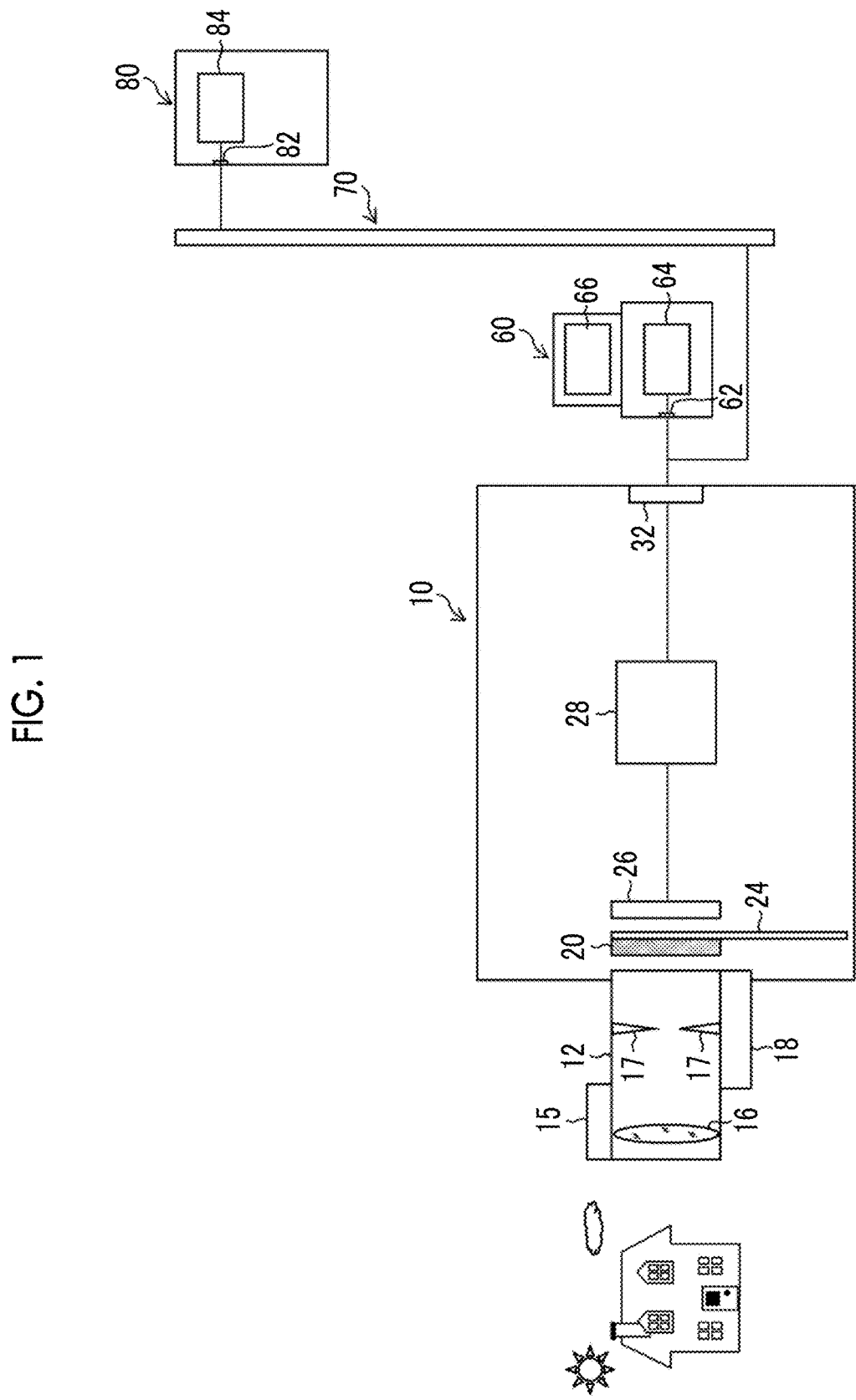
FIG. 1 is a block diagram illustrating a functional configuration example of an imaging device, and is a diagram illustrating a case where a visible light image (moving image) is captured in daytime.
Figure 2:
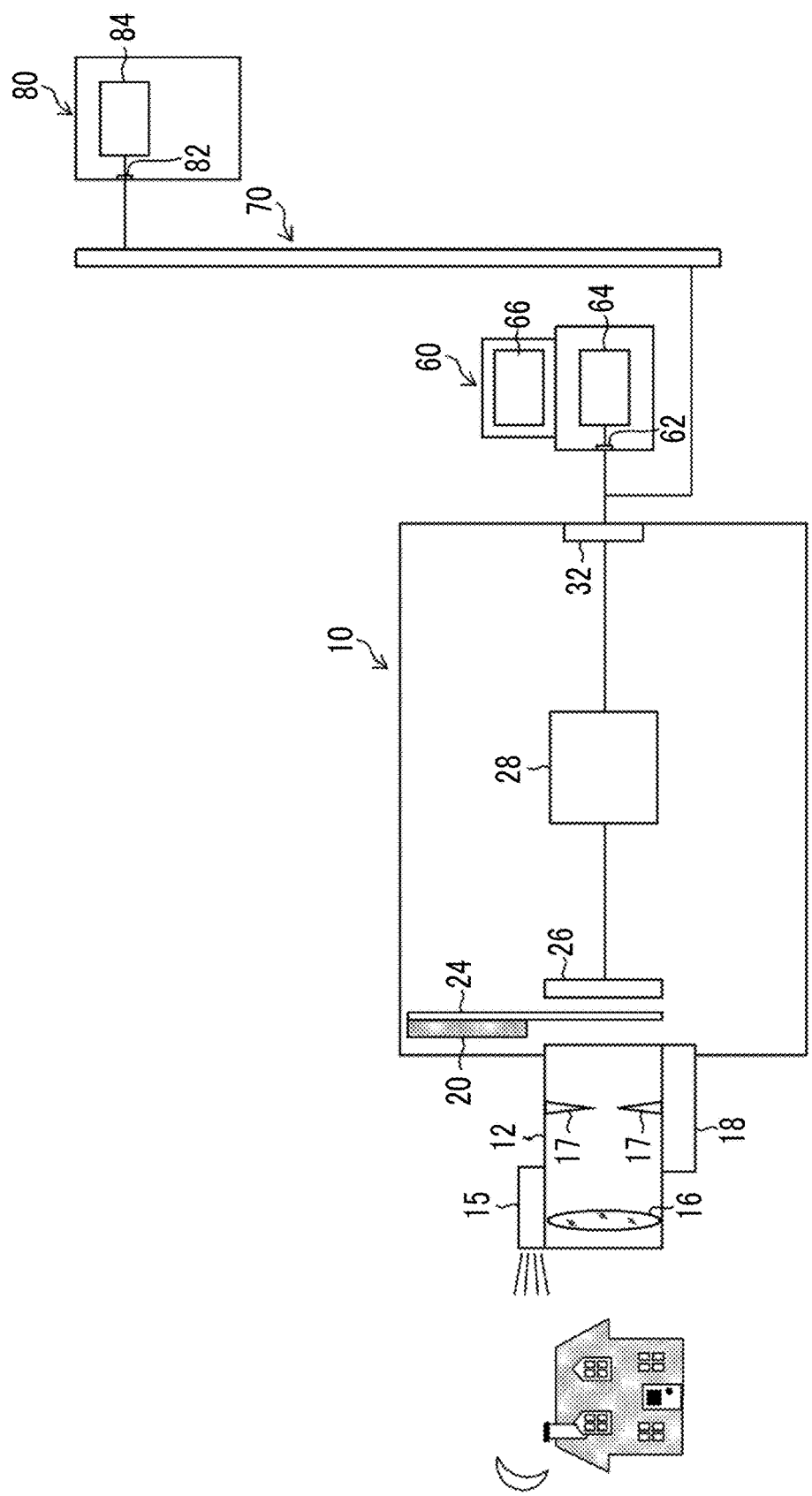
FIG. 2 is a block diagram illustrating a functional configuration example of an imaging device, and is a diagram illustrating a case where a near-infrared light image (moving image) is captured at twilight and nighttime.

FIGS. 1 and 2 are block diagrams each illustrating a functional configuration example of an imaging device 10 that is connected to a computer. FIG. 1 illustrates a case where a visible light image (moving image) in the daytime is captured by the imaging device 10, and FIG. 2 illustrates a case where a near-infrared light image (moving image) during twilight and nighttime is captured by the imaging device 10.

The imaging device 10 illustrated in FIGS. 1 and 2 is a surveillance camera on which a day and night function is mounted, and includes a visible light image capturing mode for capturing a visible light image and a near-infrared light image capturing mode for capturing a near-infrared light image.

As illustrated in FIGS. 1 and 2, the imaging device 10 mainly includes a lens unit 12, a near-infrared light emitting unit 15, a filter device 24, and an imaging element (image acquisition unit) 26 that constitute an imaging unit, a camera controller 28, and an input and output interface 32.

The lens unit 12 includes an optical system such as a lens 16 and a stop 17, and an optical system operation unit 18 that controls the optical system. The optical system operation unit 18 includes a manual operation unit that adjusts a focus position of the lens 16, and a stop drive unit that drives the stop 17 using a control signal applied from the camera controller 28.

Figure 3:
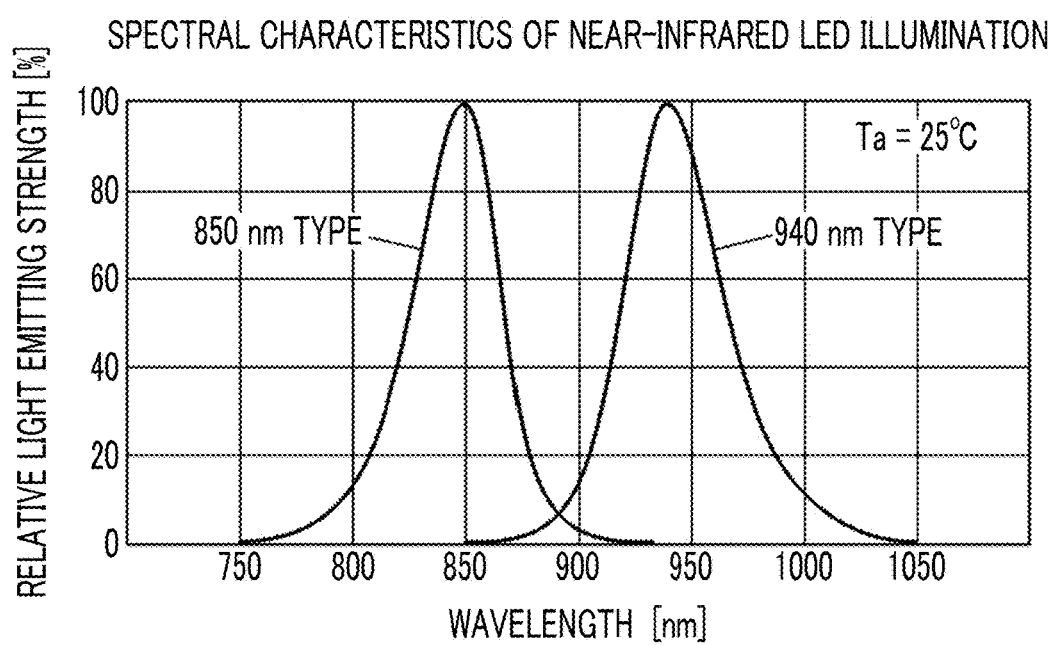
FIG. 3 is a graph showing spectral characteristics of a near-infrared LED of an 850 nm type and a near-infrared LED of a 940 nm type.

The near-infrared light emitting unit 15 includes a near-infrared light emitting diode (near-infrared LED), and continuously emits (radiates) near-infrared light as auxiliary light according to a lighting command applied from the camera controller 28 in the near-infrared light image capturing mode, as illustrated in FIG. 2. The near-infrared LED includes a near-infrared LED having spectral characteristics of an 850 nm type and a near-infrared LED having spectral characteristics of a 940 nm type as illustrated in FIG. 3, both of which can be used as a light source of the near-infrared light emitting unit 15.

In the filter device 24, by moving a slide plate including an infrared cut filter 20 in a direction perpendicular to an optical axis or rotating a turret including the infrared cut filter 20, the infrared cut filter 20 is inserted into or retracted from the imaging optical path. According to a command applied from the camera controller 28, the infrared cut filter 20 is inserted into the imaging optical path in the visible light image capturing mode (FIG. 1) and the infrared cut filter 20 is retracted from the imaging optical path in the near-infrared light image capturing mode (FIG. 2).

The imaging element 26 includes a complementary metal-oxide semiconductor (CMOS) type color image sensor. The imaging element 26 is not limited to the CMOS type and may be an XY address type or charge coupled device (CCD) type image sensor.

Figure 4A:
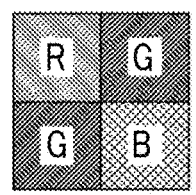
FIGS. 4A and 4B are a diagram illustrating a basic arrangement pattern of a Bayer array and a diagram illustrating spectral transmittance characteristics of each color filter of RGB.

The imaging element 26 includes a plurality of pixels arranged in a matrix form, and each pixel includes a microlens, a red (R), green (G), or blue (B) color filter, and a photoelectric conversion unit (such as a photodiode). The RGB color filters have a filter array in a predetermined pattern (such as a Bayer array or an X-Trans (registered trademark) array). FIG. 4A illustrates a basic arrangement pattern of the Bayer array.

Figure 4B:
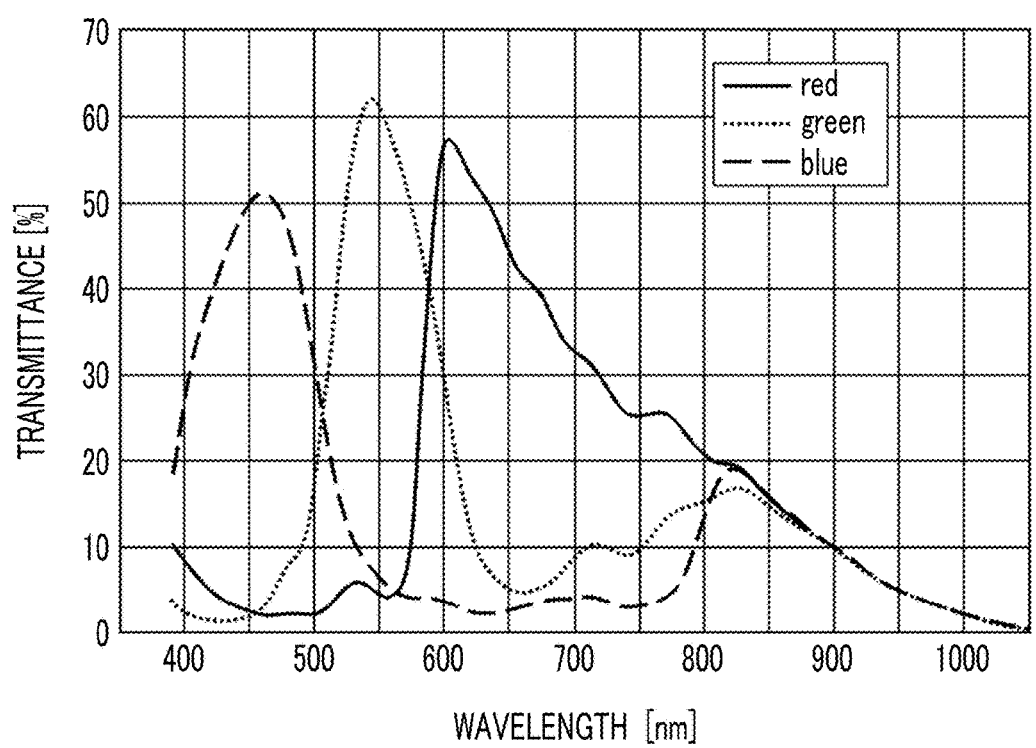

FIG. 4B illustrates spectral transmittance characteristics of the respective color filters of RGB. Pixels having respective color filters of RGB (hereinafter, an R pixel, a G pixel, and a B pixel) have substantially the same sensitivity to the near-infrared light (see FIG. 3) of the near-infrared LED having spectral characteristics of an 850 nm type or a 940 nm type, as illustrated in FIG. 4B. Thus, in the near-infrared light image capturing mode, the R pixel, the G pixel, and the B pixel of the imaging element 26 function as near-infrared light pixels (infrared (IR) pixels), respectively.

That is, at the time of imaging in the visible light image capturing mode, first image data indicating the visible light image, which is mosaic data corresponding to the filter array of the RGB color filter (mosaic color data (RGB data) of red (R), green (G), and blue (B)), is output from the imaging element 26. At the time of imaging in the near-infrared light image capturing mode, second image data indicating the near-infrared light image, which is near-infrared light image data (IR data) representing a black and white image of a single screen, is output from the imaging element 26.

The camera controller 28 has a function as a device control unit 34 that generally controls each unit of the imaging device 10, and a function as an image processing unit (image processing device) 35 that performs image processing of the image data (the first image data indicating the visible light image captured in the visible light image capturing mode or the second image data including the near-infrared light image captured in the near-infrared light image capturing mode) sent from the imaging element 26, although will be described in detail below.

In the camera controller 28, the image data subjected to image processing is stored in a storage unit (not illustrated) provided in the imaging device 10 and/or is sent to a computer 60 or the like via an input and output interface 32. A format of the image data output from the camera controller 28 is not particularly limited, and may be a format such as Moving Picture Experts Group (MPEG) or H.264 in the case of a moving image and may be a format such as Joint Photographic Experts Group (JPEG) or Tagged Image File Format (TIFF) in the case of a still image. Further, raw data (RAW data) not subjected to image processing by the image processing unit 35 may be output. Further, the camera controller 28 may associate header information (imaging date and time, model, number of pixels, a stop value, or the like), main image data, and a plurality of related data such as thumbnail image data with one another to constitute one image file, as in a so-called Exchangeable Image File Format (Exif), and output the image file.

The computer 60 is connected to the imaging device 10 via the input and output interface 32 of the imaging device 10 and a computer input and output unit 62, and receives data such as the image data sent from the imaging device 10. A computer controller 64 controls the entire computer 60, performs image processing on the image data from the imaging device 10, and controls communication with a server 80 or the like connected to the computer input and output unit 62 via a network line such as the Internet 70. The computer 60 has a display 66, and processing content or the like in the computer controller 64 is displayed on the display 66, as necessary. A user can operate an input means (not illustrated) such as a keyboard while confirming the display on the display 66 to input data or commands to the computer controller 64. Thus, the user can control the computer 60 or devices (the imaging device 10 and the server 80) connected to the computer 60.

The server 80 includes a server input and output unit 82 and a server controller 84. The server input and output unit 82 constitutes a transmission and reception connection unit with respect to an external device such as the computer 60, and is connected to the computer input and output unit 62 of the computer 60 via a network line such as the Internet 70. The server controller 84 performs transmission and reception of data to and from the computer controller 64 in cooperation with the computer controller 64 in response to a control command signal from the computer 60, as necessary, to download the data to the computer 60, and performs a calculation process to transmit a result of the calculation to the computer 60.

Each controller (the camera controller 28, the computer controller 64, or the server controller 84) includes a circuit necessary for a control process and includes, for example, a central processing device (such as a central processing unit (CPU)) or a memory. Communication between the imaging device 10, the computer 60, and the server 80 may be wired communication or may be wireless communication. Further, the computer 60 and the server 80 may be integrally configured or the computer 60 and/or the server 80 may be omitted. Further, the imaging device 10 may have a function of communication with the server 80 such that direct transmission and reception of data may be performed between the imaging device 10 and the server 80. Further, the RAW data may be transmitted from the imaging device 10 to the computer 60 or the server 80, and an image processing unit (image processing device) of the computer 60 or the server 80 may function as the image processing unit 35 (FIG. 5) in the camera controller 28 to perform image processing on the input RAW data.

The imaging device 10 in this example is a surveillance camera having a day and night function, and is fixed to a fixed point and used. In this case, at the time of installation of the imaging device 10, a focus position of the lens 16 is adjusted by the optical system operation unit 18 to perform focus adjustment for focusing on the subject. Further, adjustment of a zoom magnification (zoom adjustment) is also performed, as necessary.

Figure 6:
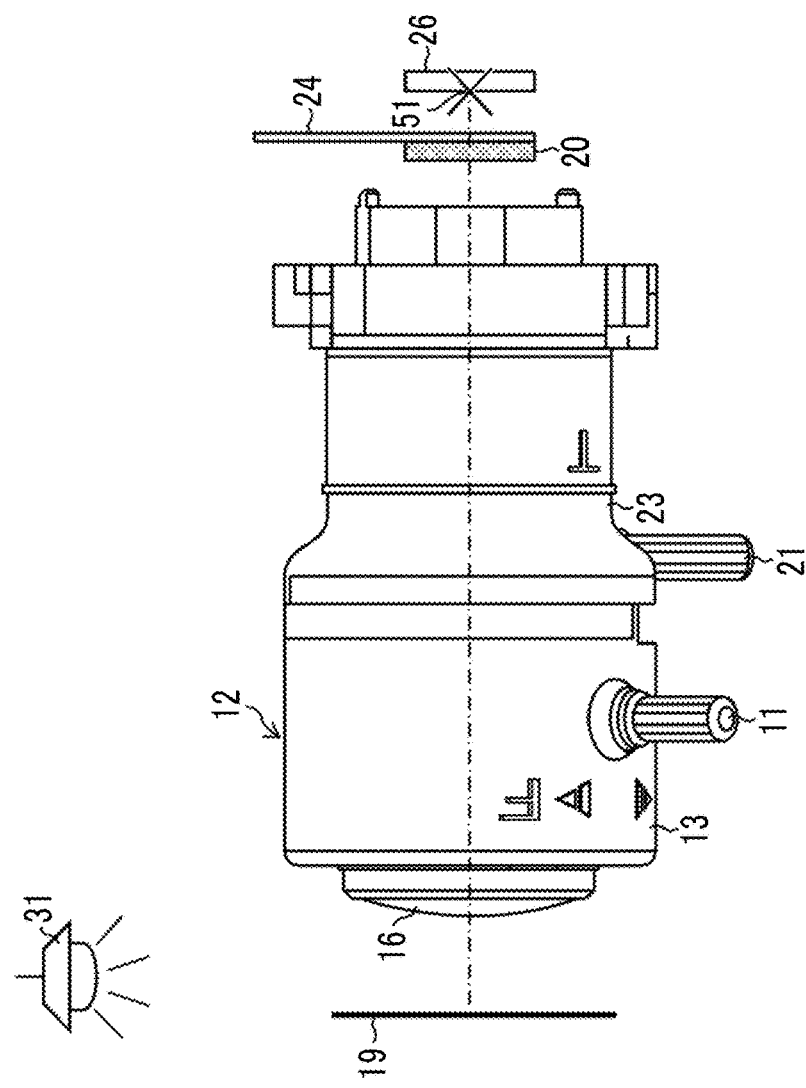
FIGS. 6A and 6B are diagrams illustrating an imaging unit of an imaging device fixed at a fixed point and a visible light image of a test chart actually captured after focus adjustment of the imaging unit.

FIG. 6A is a diagram illustrating an imaging unit (the lens unit 12, the filter device 24, and the imaging element 26) of the imaging device 10 fixed to a fixed point, and FIG. 6B is a diagram illustrating an image (visible light image) of a test chart 19 actually captured after focus adjustment of the imaging unit.

In FIG. 6A, a focus lever 11 (focus adjustment unit) that rotates a focus ring 13 and a zoom lever 21 that rotates a zoom ring 23 corresponds to the optical system operation unit 18 (FIG. 1) of the lens unit 12.

The focus adjustment and the zoom adjustment are performed in the visible light image capturing mode. That is, the infrared cut filter 20 is inserted into the imaging optical path, imaging is performed under an illumination using an artificial light source 31 for visible light such as a fluorescent lamp, or sunlight, and the focus adjustment and the zoom adjustment are performed while viewing the captured image.

That is, as illustrated in FIG. 6A, the focus ring 13 is rotated by the focus lever 11 to adjust the focus position of the lens 16 while viewing an actually captured image of the test chart 19 (FIG. 6B) so that the focus position 51 matches a position on the light reception surface of the imaging element 26.

In a case where the lens unit 12 is focus-adjusted in this way, a focus position of the near-infrared light image captured in the near-infrared light image capturing mode is shifted from a position on a light reception surface of the imaging element 26 according to retraction of the infrared cut filter 20 or a difference in wavelength between the visible light and the near-infrared light. That is, it is easy for the near-infrared light image captured in the near-infrared light image capturing mode to enter a defocused state due to shift of an image surface position, and to be blurred as compared with the visible light image.

[Image Processing Device]

<First Embodiment of Image Processing Device>

Figure 5:
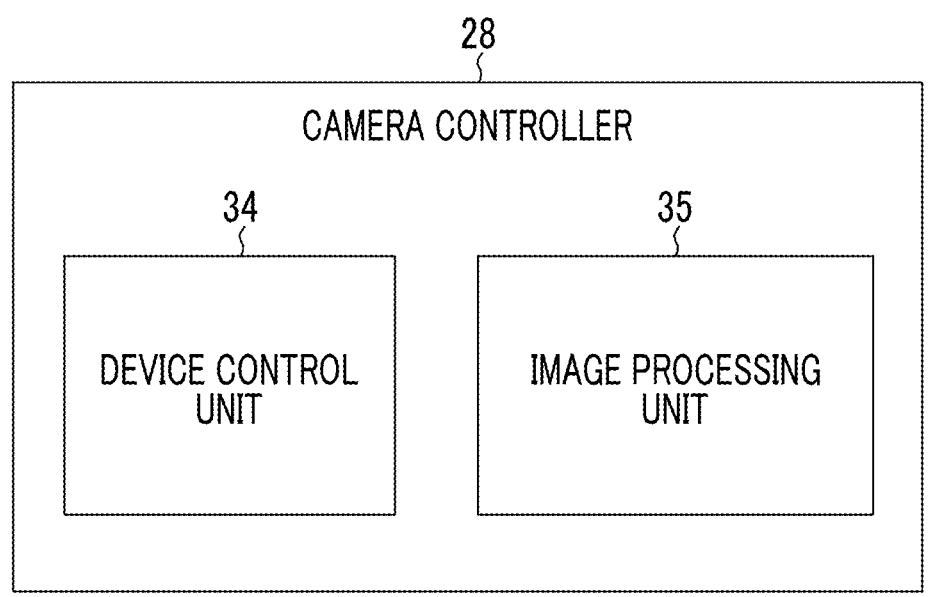
FIG. 5 is a block diagram illustrating a configuration example of a camera controller.
Figure 7:
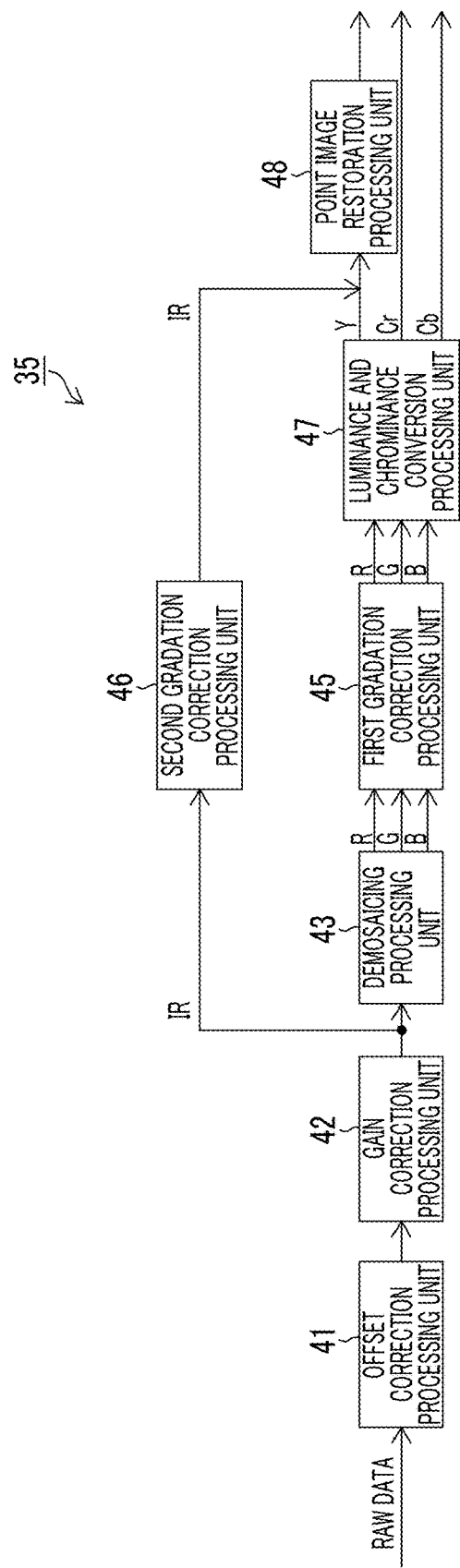
FIG. 7 is a block diagram illustrating a first embodiment of an image processing unit in a camera controller.

FIG. 7 is a block diagram illustrating a first embodiment of the image processing unit 35 in the camera controller 28 illustrated in FIG. 5.

The image processing unit 35 of the first embodiment illustrated in FIG. 7 includes an offset correction processing unit 41, a gain correction processing unit 42, a demosaicing processing unit 43, a first gradation correction processing unit 45 including a gamma correction processing unit, a second gradation correction processing unit 46, a luminance and chrominance conversion processing unit 47, and a point image restoration processing unit 48.

The offset correction processing unit 41 point-sequentially receives the RAW data before image processing (mosaic RGB data, or IR data) acquired from the imaging element 26. The RAW data is, for example, data having a bit length of 12 bits (0 to 4095) (2-byte data for one pixel) for each of RGB. Further, the RAW data in this example is continuously captured moving image data.

The offset correction processing unit 41 is a processing unit that corrects a dark current component included in the input RAW data, and performs offset correction of the RAW data by subtracting an optical black area signal value obtained from light-shielded pixels on the imaging element 26 from the RAW data.

The RAW data subjected to the offset correction is applied to the gain correction processing unit 42. In a case where the RAW data is RGB data, the gain correction processing unit 42 functions as a WB correction processing unit that adjusts white balance (WB) and multiplies RGB data by a WB gain set for each of RGB to perform white balance correction of the RGB data. For the WB gain, for example, a type of light source is automatically determined on the basis of the RGB data or the type of light source is manually selected, and the WB gain suitable for the determined or selected type of light source is set, but a WB gain setting method is not limited thereto and the WB gain may be set using other known methods.

Further, in a case where the RAW data is IR data, the gain correction processing unit 42 functions as sensitivity correction processing unit that corrects a difference in sensitivity among the R pixel, the G pixel, and the B pixel to the near-infrared light. The gain correction processing unit 42 multiplies the IR data corresponding to the R pixel, the G pixel, and the B pixel by a gain for causing integrated average values of IR data output from the R pixel, G pixel, and the B pixel to be 1:1:1 to correct the IR data. In a case where there is no difference in sensitivity to the near-infrared light in the R pixel, the G pixel, and the B pixel, the correction of the sensitivity difference in the gain correction processing unit 42 is unnecessary.

The demosaicing processing unit 43 is a unit that performs demosaicing processing (also referred to as a "synchronization process") for calculating all of pieces of color information for respective pixels from a mosaic image corresponding to the color filter array of the imaging element 26 of a single plate type. For example, in a case of an imaging element including color filters for three colors RGB, color information of all of RGB for the respective pixels is calculated from the mosaic image including RGB. That is, the demosaicing processing unit 43 generates image data of three surfaces of RGB that are synchronized from the mosaic data (point-sequential RGB data). Demosaicing processing in the demosaicing processing unit 43 is not performed on the IR data.

The RGB data subjected to demosaicing processing is applied to the first gradation correction processing unit 45. The first gradation correction processing unit 45 is a unit that performs nonlinear gradation correction on the RGB data. The first gradation correction processing unit 45 performs, for example, gamma-correction processing using logarithmic processing on the input RGB data, and performs nonlinear processing on the RGB data so that an image is naturally reproduced by a display device.

In this example, the first gradation correction processing unit 45 performs gamma correction corresponding to gamma characteristics on the RGB data of 12 bits (0 to 4095) to generate RGB color data of 8 bits (0 to 255) (1-byte data). The first gradation correction processing unit 45 can include, for example, a look-up table for each of RGB and preferably performs gamma correction corresponding to each color of the RGB data. The first gradation correction processing unit 45 performs nonlinear gradation correction according to a tone curve on the input data.

The RGB data subjected to the gradation correction by the first gradation correction processing unit 45 is applied to the luminance and chrominance conversion processing unit 47. The luminance and chrominance conversion processing unit 47 is a processing unit that converts first color data (G data) and second color data (R data and B data) of two or more colors having a contribution rate for obtaining luminance data lower than that of the first color data (G data) into luminance data Y indicating a luminance component and chrominance data Cr and Cb and can calculate the data using the following mathematical formula.

$Y=0.299R+0.587G+0.114B$ $Cb=-0.168736R-0.331264G+0.5B$ $Cr=-0.5R-0.418688G-0.081312B$ [Mathematical Formula 1]

A conversion equation from the RGB data to the luminance data Y and the chrominance data Cr and Cb is not limited to Mathematical Formula 1 above.

The luminance data Y converted from the RGB data by the luminance and chrominance conversion processing unit 47 is applied to the point image restoration processing unit 48.

On the other hand, the IR data subjected to the sensitivity correction by the gain correction processing unit 42 in the near-infrared light image capturing mode is applied to the second gradation correction processing unit 46, in which the same gradation correction as the gradation correction process in the first gradation correction processing unit 45 is performed. That is, the second gradation correction processing unit 46 can include a look-up table for IR, and performs gamma correction corresponding to gamma characteristics on the input 12-bit IR data to generate 8-bit IR data. Since the first gradation correction processing unit 45 and the second gradation correction processing unit 46 are different in the look-up table for gradation correction and are the same in others, a common processing circuit can be used.

The IR data subjected to the gradation correction by the second gradation correction processing unit 46 is applied to the point image restoration processing unit 48.

The luminance data Y or the IR data is input to the point image restoration processing unit 48 according to the imaging mode (the visible light image capturing mode or the near-infrared light image capturing mode), and the point image restoration processing unit 48 performs a point image restoration process on the input luminance data Y or the IR data.

[Point Image Restoration Processing Unit]

<First Embodiment of Point Image Restoration Processing Unit>

Next, a first embodiment of the point image restoration processing unit 48 illustrated in FIG. 7 will be described.

Figure 8:
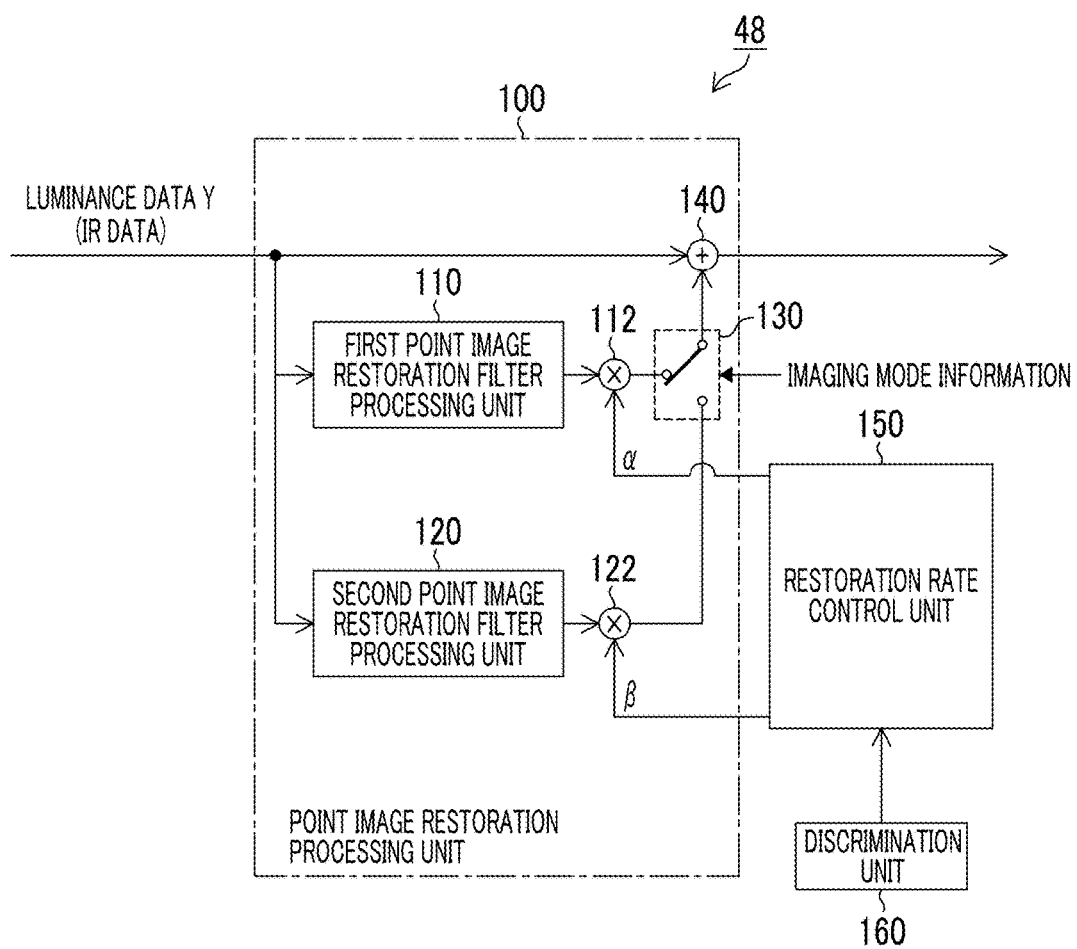
FIG. 8 is a block diagram illustrating a point image restoration processing unit according to the first embodiment.

FIG. 8 is a block diagram illustrating the point image restoration processing unit 48 of the first embodiment. The point image restoration processing unit 48 of the first embodiment mainly includes a point image restoration processing unit 100 including a first point image restoration filter processing unit 110, a second point image restoration filter processing unit 120, multipliers 112 and 122, a change-over switch 130, and an adder 140, a restoration rate control unit 150, and a discrimination unit 160.

The first point image restoration processing unit that performs the first point image restoration process on the luminance data Y (first image data) includes the first point image restoration filter processing unit 110, the multiplier 112, and the adder 140.

The first point image restoration filter processing unit 110 applies a first point image restoration filter based on the first point spread function for visible light of an optical system (the lens 16 or the like) to the input luminance data Y according to the imaging mode to generate increment or decrement data (first increment or decrement data) of the luminance data Y subjected to the point image restoration process.

The multiplier 112 performs multiplication of a first gain α on the first increment or decrement data generated by the first point image restoration filter processing unit 110 and performs gain control of the first increment or decrement data (adjustment of the first restoration rate through the point image restoration process). The first increment or decrement data subjected to the gain control by the multiplier 112 is output to an input terminal of the changeover switch 130.

Meanwhile, the second point image restoration processing unit that performs the second point image restoration process on the IR data (second image data) includes the second point image restoration filter processing unit 120, the multiplier 122, and the adder 140.

The second point image restoration filter processing unit 120 applies a second point image restoration filter based on the second point spread function for near-infrared light of an optical system (the lens 16 or the like) to the input IR data according to the imaging mode to generate increment or decrement data (second increment or decrement data) of the IR data subjected to the point image restoration process.

The multiplier 122 performs multiplication of a second gain β on the second increment or decrement data generated by the second point image restoration filter processing unit 120 and performs gain control of the second increment or decrement data (adjustment of the second restoration rate through the point image restoration process). The second increment or decrement data subjected to the gain control by the multiplier 122 is output to an input terminal of the changeover switch 130.

Imaging mode information indicating whether the imaging mode is the visible light image capturing mode or the near-infrared light image capturing mode is applied from the camera controller 28 to the changeover switch 130, and the changeover switch 130 selects the increment or decrement data applied to one of the two input terminals according to the imaging mode information, and outputs the selected increment or decrement data to the adder 140. That is, the changeover switch 130 outputs the first increment or decrement data input from the multiplier 112 to the adder 140 in the visible light image capturing mode, and outputs the second increment or decrement data input from the multiplier 122 to the adder 140 in the near-infrared light image capturing mode.

The luminance data Y or the IR data is applied to the other input of the adder 140 according to the imaging mode, and the adder 140 adds the input luminance data Y or IR data to the increment or decrement data applied from the changeover switch 130. Thus, the luminance data Y or the IR data subjected to the point image restoration process is output from the adder 140.

Next, the first gain α and the second gain β that are applied to the multipliers 112 and 122 respectively will be described.

The restoration rate control unit 150 sets the first gain α and the second gain β to desired gain values to control the restoration strength (restoration rate) in the point image restoration process for the luminance data Y. The restoration rate control unit 150 sets gain values (magnitudes) of the first gain α and the second gain β according to a discrimination result from the discrimination unit 160 to be described below and outputs the set first gain α and the set second gain β to the multipliers 112 and 122.

The discrimination unit 160 discriminates whether or not the near-infrared light has been emitted (radiated) from the near-infrared light emitting unit 15 in the near-infrared light image capturing mode, and also discriminates whether or not the image has been captured under a light source in which the visible light and the near-infrared light coexist in the near-infrared light image capturing mode.

In the near-infrared light image capturing mode, typically, the near-infrared light emitting unit 15 is turned on and emits the near-infrared light as auxiliary light. However, the subject may be not irradiated with the near-infrared light, for example, in a case where there is an artificial light source in a time zone such as twilight or dawn or in nighttime. The discrimination unit 160 discriminates whether or not the near-infrared light has been emitted from the near-infrared light emitting unit 15 in the near-infrared light image capturing mode in which the infrared cut filter 20 is retracted from the imaging optical path.

Further, the discrimination unit 160 discriminates whether or not the imaging is imaging under the light source in which the visible light and the near-infrared light coexist on the basis of brightness of the subject in the near-infrared light image capturing mode.

Since the camera controller 28 detects the brightness (exposure value (EV value)) of the subject in a case where performing automatic exposure control through control of the stop 17 or control of a shutter speed (charge storage time of the imaging element 26). In a case where the detected EV value is equal to or smaller than a value that is not suitable for capturing of the visible light image, the camera controller 28 switches the imaging mode from the visible light image capturing mode to the near-infrared light image capturing mode.

The discrimination unit 160 can discriminate whether or not the imaging is imaging under the light source in which the visible light and the near-infrared light coexist using the EV value detected by the camera controller 28 as the brightness of the subject in the near-infrared light image capturing mode.

<First Embodiment of Restoration Strength Setting>

In a case where the discrimination unit 160 discriminates that the subject is irradiated with the near-infrared light from the near-infrared light emitting unit 15 in the near-infrared light image capturing mode, the restoration rate control unit 150 sets the second gain β such that the second gain β is greater than the first gain α. This set second gain β is hereinafter referred to as a "second gain β1".

Since the restoration rate control unit 150 sets the second gain β1 such that the second gain β1 is greater than the first gain α as described above, the restoration strength in the point image restoration process for the IR data can be higher (the restoration rate can be higher) than the restoration strength (restoration rate) in the point image restoration process for the luminance data Y.

Incidentally, in a case where the restoration strength in the point image restoration process is high, this tends to be overcorrection in which artifacts are generated. In a case where the restoration strength is low, adverse effects of overcorrection can be avoided, but sufficient point image restoration is not performed and blurs remain.

In the "first embodiment of restoration strength setting", a reason for causing the restoration strength in the point image restoration process with respect to the IR data to be higher than the restoration strength in the point image restoration process with respect to the luminance data Y is that, since the subject is irradiated with the near-infrared light, an S/N ratio of the IR data is high and an adverse effect of overcorrection is less even in a case where the restoration strength is high, whereas as described with reference to FIGS. 6A and 6B, the IR data is captured with shift from a focus position focus-adjusted with respect to the visible light image (luminance data Y) (in a defocused state) according to retraction of the infrared cut filter 20 or a difference (chromatic aberration) in wavelength as compared with the luminance data Y, and is blurred as compared with the luminance data Y. Therefore, the restoration strength in the point image restoration process for the IR data is made higher than the restoration strength in the point image restoration process for the luminance data Y in order to enhance the sharpness improvement effect of the IR data.

<Second Embodiment of Restoration Strength Setting>

In a case where the discrimination unit 160 discriminates that the subject is not irradiated with the near-infrared light in the near-infrared light image capturing mode, the restoration rate control unit 150 sets the second gain β such that the second gain β is smaller than the first gain α. This set second gain β is hereinafter referred to as a "second gain β2".

Since the restoration rate control unit 150 sets the second gain β2 such that the second gain β2 is smaller than the first gain α as described above, the restoration strength in the point image restoration process for the IR data can be lower (the restoration rate can be lower) than the restoration strength in the point image restoration process for the luminance data Y.

In the "second embodiment of restoration strength setting", a reason for causing the restoration strength in the point image restoration process for the IR data to be lower than the restoration strength in the point image restoration process for the luminance data Y is that, since the subject is not irradiated with the near-infrared light, the S/N ratio of the IR data is low and high restoration strength easily causes overcorrection in which artifacts are generated. Therefore, in order to prevent an adverse effect of the overcorrection, the restoration strength in the point image restoration process for the IR data is made lower than the restoration strength in the point image restoration process for the luminance data Y.

<Third Embodiment of Restoration Strength Setting>

In a case where the discrimination unit 160 discriminates that the subject is not irradiated with the near-infrared light in the near-infrared light image capturing mode and discriminates that imaging is performed under the light source in which the visible light and the near-infrared light coexist, the restoration rate control unit 150 sets the second gain β such that the second gain β is greater than the second gain β2 in the "second embodiment of restoration strength setting". This set second gain β is hereinafter referred to as a "second gain β3".

Since the IR data captured in a twilight or dawn state (under a light source in which visible light and near-infrared light coexist) is captured without radiation of the near-infrared light as in nighttime and is brighter than the IR data not including the visible light component (IR data including only the near-infrared light component), an S/N ratio is high. Therefore, the restoration strength (second gain β3) in the point image restoration process for the IR data including the visible light component and the near-infrared light component is made higher than the restoration strength (second gain β2) in the point image restoration process for the IR data including only the near-infrared light component. In this case, for the IR data including the visible light component and the near-infrared light component, overcorrection is not performed even in a case where the restoration strength in the point image restoration process for IR data is high (even in a case where the second gain β3 is great), and the IR data degraded due to imaging can be restored into high image quality IR data.

Further, the restoration rate control unit 150 sets the second gain β3 so that the second gain β3 in the "third embodiment of restoration strength setting" is smaller than the second gain β1 in the "first embodiment of restoration strength setting". This is because the S/N ratio of the IR data acquired in a case where the subject is not irradiated with the near-infrared light from the near-infrared light emitting unit 15 in a twilight or dawn state is smaller than the S/N ratio of the IR data acquired in a case where the subject is irradiated with the near-infrared light from the near-infrared light emitting unit 15, and too high restoration strength in the point image restoration process for the IR data easily leads to overcorrection.

Meanwhile, although the restoration strength (first gain α) in the point image restoration process for the luminance data Y is, for example, target restoration strength in the point image restoration process, and may be a fixed value (for example, the first gain α=1), the restoration strength may be changed according to imaging setting conditions (for example, a type of lens, a stop value, a zoom magnification, or a subject distance).

Further, although the restoration strength (second gain β) in the point image restoration process for IR data is set to the second gain β1, β2, or β3 shown in the "first embodiment of restoration strength setting" to the "third embodiment of restoration strength setting" on the basis of the determination result from the discrimination unit 160, the second gain β1, β2, or β3 may be a fixed value. In a case where the first gain α is changed, the second gain β1, β2, or β3 may be correspondingly changed.

[First Embodiment of Image Processing Method]

Figure 9:
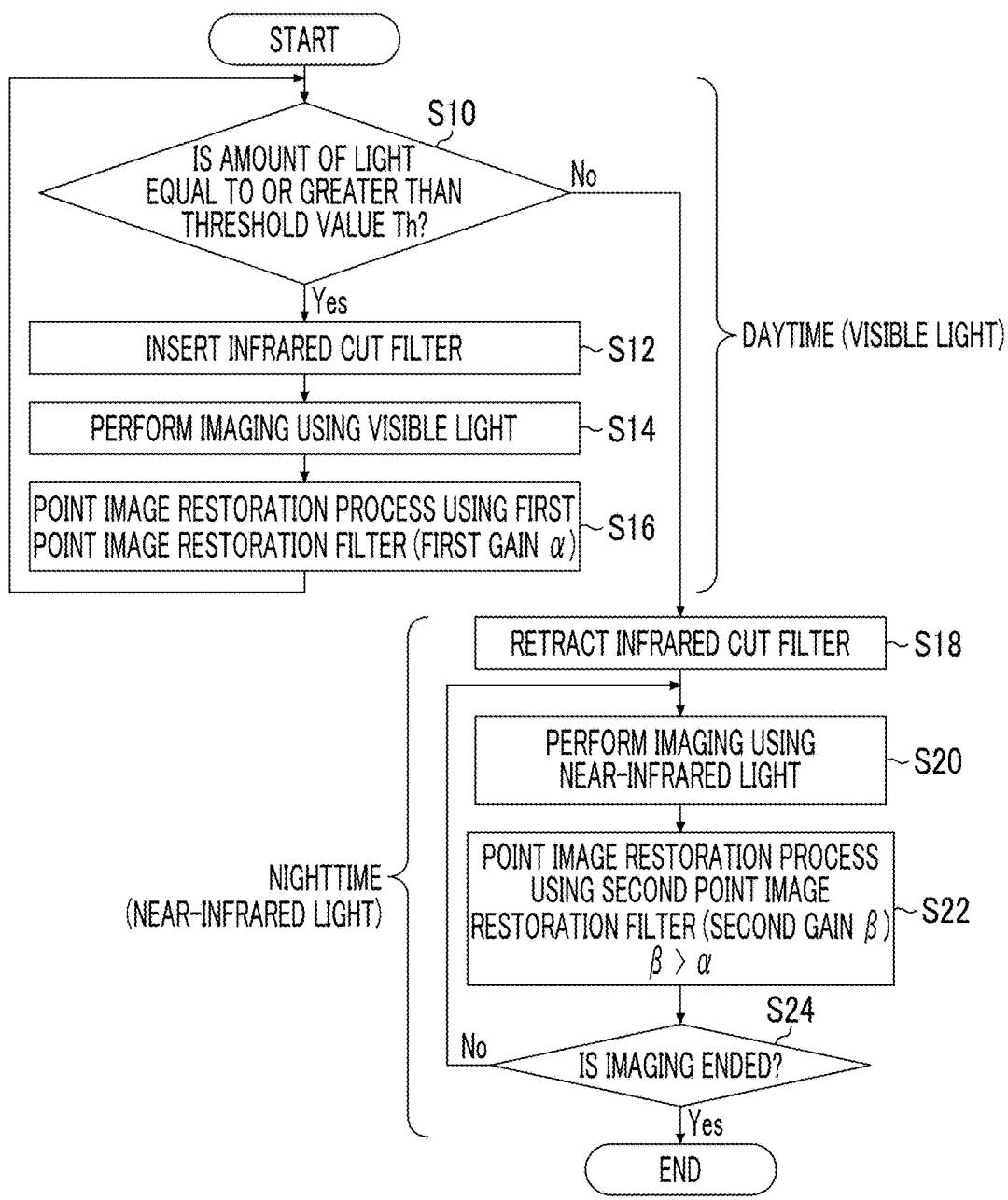
FIG. 9 is a flowchart illustrating the first embodiment of an image processing method.

FIG. 9 is a flowchart illustrating a first embodiment of the image processing method according to the present invention.

In FIG. 9, the camera controller 28 detects the amount of light (for example, an EV value) of the subject, and discriminates whether the detected amount of light is equal to or greater than a threshold value Th (step S10). In a case where the detected amount of light is equal to or greater than the threshold value Th ("Yes"), the process proceeds to step S12 to switch the imaging mode to the visible light image capturing mode that is an imaging mode in daytime.

In step S12, the infrared cut filter 20 is inserted into the imaging optical path, and imaging (capturing of the visible light image) using only the visible light having sensitivity to a visible light wavelength band is performed in step S14. The luminance data Y of the captured visible light image is subjected to the point image restoration process using the first point image restoration filter (step S16). That is, the point image restoration process using the first point image restoration filter based on the first point image restoration filter processing unit 110, the multiplier 112, and the adder 140, which is a point image restoration process with the restoration strength (restoration rate) of the first gain α, is performed (step S16).

On the other hand, in step S10, in a case where the detected amount of light is smaller than the threshold value Th ("No"), the process proceeds to step S18, and the imaging mode is switched to the near-infrared light image capturing mode that is a nighttime imaging mode. That is, the camera controller 28 retracts the infrared cut filter 20, and turns on the near-infrared light emitting unit 15 to irradiate the subject with the near-infrared light (step S18).

Subsequently, imaging through the imaging (near-infrared light image capturing mode) using the near-infrared light having a sensitivity to a visible light wavelength band and a near-infrared light wavelength band is performed (step S20).

The IR data captured in the near-infrared light image capturing mode is subjected to the point image restoration process using the second point image restoration filter (step S22). That is, the point image restoration process using the second point image restoration filter based on the second point image restoration filter processing unit 120, the multiplier 122, and the adder 140, which is a point image restoration process with restoration strength (restoration rate) of the second gain $\beta$, is performed. The second gain $\beta$ is the second gain $\beta 1$ that is set in the "first embodiment of restoration strength setting", and a gain greater than the first gain $\alpha$.

Subsequently, it is discriminated whether or not nighttime imaging ends (step S24). In a case where the imaging is not ended ("No"), the process proceeds to step S20 to repeat the process from step S20 to step S24. On the other hand, in a case where the imaging is ended ("Yes"), this imaging operation is ended.

In a case where the amount of light reaches a value corresponding to daytime (for example, a sum of the threshold value Th and the amount of light corresponding to an increase due to radiation of the near-infrared light) without ending the nighttime imaging, the imaging mode may be switched to the visible light image capturing mode again and the process from step S10 to step S16 may be performed.

[Second Embodiment of Image Processing Method]

Figure 10:
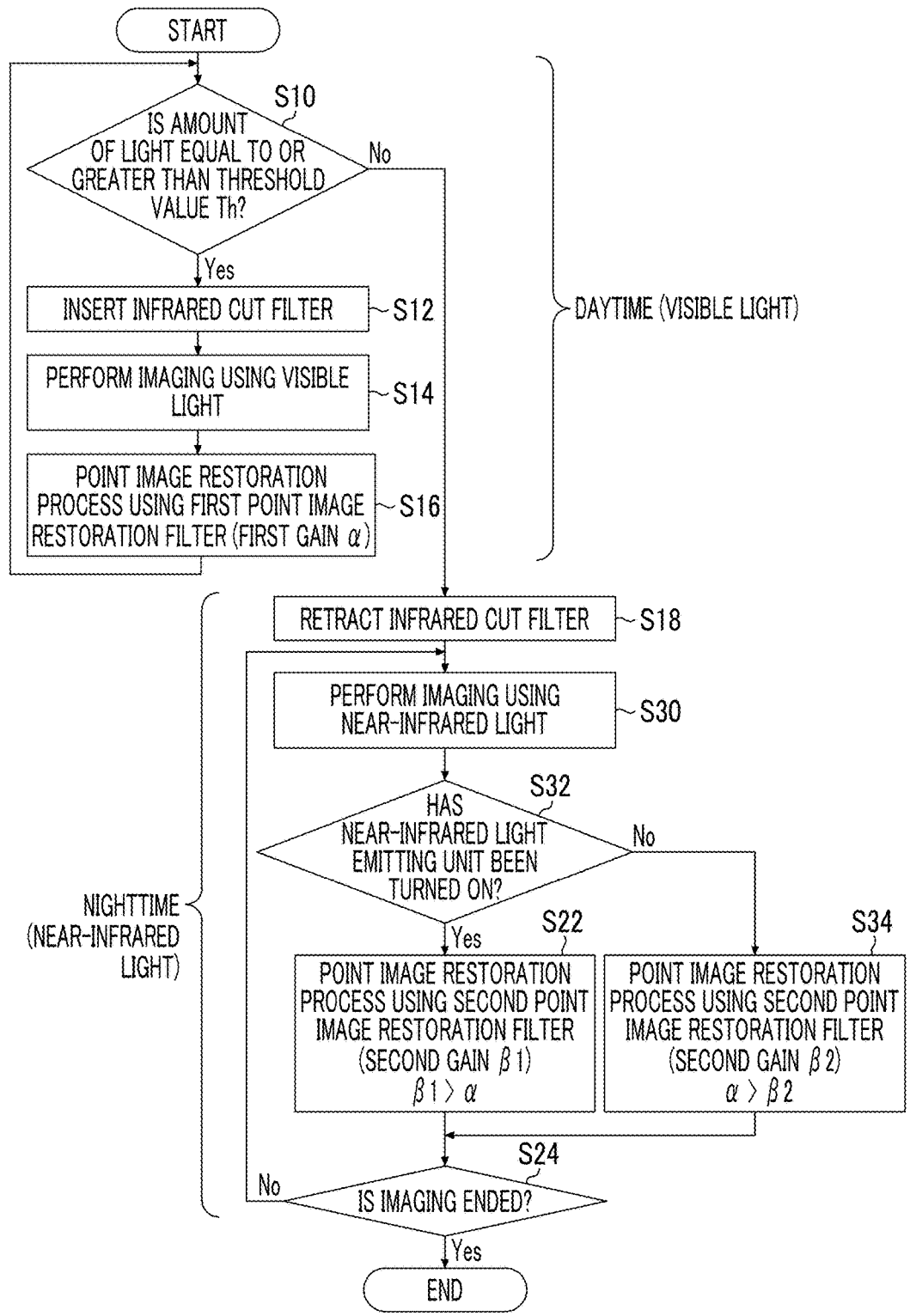
FIG. 10 is a flowchart illustrating a second embodiment of the image processing method.

FIG. 10 is a flowchart illustrating a second embodiment of the image processing method according to the present invention. Steps of performing the same process as that illustrated in FIG. 9 are denoted with the same step numbers, and detailed description thereof will be omitted.

The image processing method illustrated in FIG. 10 is different from the first embodiment of the image processing method illustrated in FIG. 9 in that the restoration strength with respect to the IR data is changed according to whether or not the subject is irradiated with the near-infrared light from the near-infrared light emitting unit 15 at the time of imaging in nighttime (near-infrared light).

That is, in step S30, the imaging in a state in which the infrared cut filter 20 has been retracted (imaging using the near-infrared light) is performed, but the imaging using the near-infrared light includes imaging in a state in which the near-infrared light emitting unit 15 has been turned on and the subject has been irradiated with the near-infrared light, and imaging in a state in which the near-infrared light emitting unit 15 has been turned off and the subject has not been irradiated with the near-infrared light from the near-infrared light emitting unit 15.

In step S32, it is discriminated whether or not the near-infrared light emitting unit 15 has been turned on at the time of imaging using the near-infrared light in step S30. In a case where it is discriminated that the near-infrared light emitting unit 15 has been turned on ("Yes"), the process proceeds to step S22, and in a case where it is discriminated that the near-infrared light emitting unit 15 has not been turned on ("No"), the process proceeds to step S34.

In step S22, the point image restoration process in the second point image restoration filter, which is a point image restoration process with restoration strength (restoration rate) of the second gain $\beta 1$, is performed on the IR data acquired at the time of imaging in step S30, as in step S22 illustrated in FIG. 9. The second gain $\beta 1$ is a gain greater than the first gain $\alpha$ with respect to the luminance data Y.

Meanwhile, in step S34, the point image restoration process in the second point image restoration filter, which is a point image restoration process with restoration strength (restoration rate) of the second gain $\beta 2$, is performed on the IR data acquired at the time of imaging in step S30. The second gain $\beta 2$ is a gain smaller than the first gain $\alpha$ with respect to the luminance data Y.

A reason for causing the restoration strength (second gain $\beta 2$) in the point image restoration process for the IR data to be lower than the restoration strength (first gain $\alpha$) in the point image restoration process for the luminance data Y is that, since the subject is not irradiated with the near-infrared light from the near-infrared light emitting unit 15, the S/N ratio of the IR data is low and high restoration strength easily causes overcorrection in which artifacts are generated.

<Second Embodiment of Point Image Restoration Processing Unit>

Next, a second embodiment of the point image restoration processing unit 48 illustrated in FIG. 7 will be described.

Figure 11:
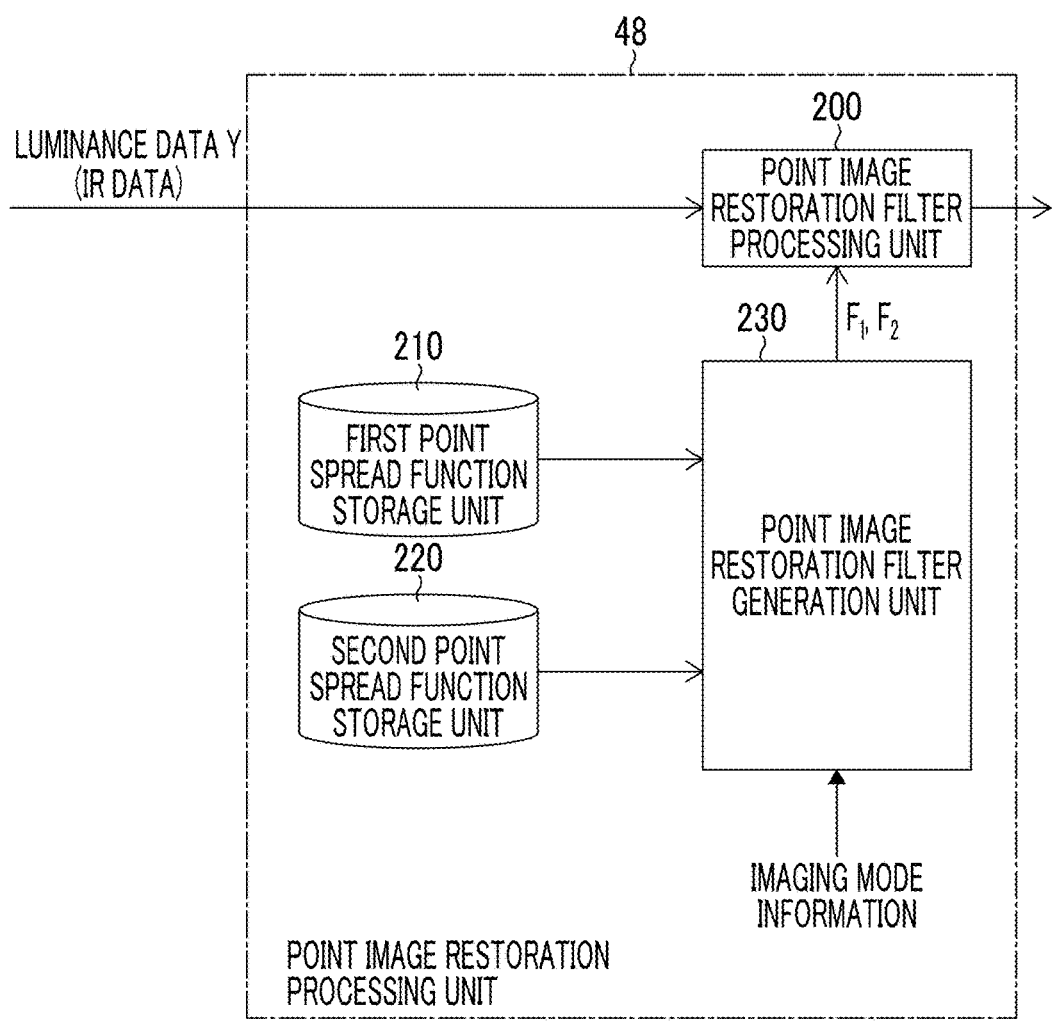
FIG. 11 is a block diagram illustrating a point image restoration processing unit according to a second embodiment.

FIG. 11 is a block diagram illustrating the point image restoration processing unit 48 of the second embodiment. The point image restoration processing unit 48 of the second embodiment mainly includes a point image restoration filter processing unit 200, a first point spread function storage unit 210, a second point spread function storage unit 220, and a point image restoration filter generation unit 230.

The point image restoration filter processing unit 200 receives the luminance data Y or the IR data according to the imaging mode, and performs the point image restoration process using any one of the first point image restoration filter $F_1$ and the second point image restoration filter $F_2$ generated by the point image restoration filter generation unit 230 on the input image data (the luminance data Y or the IR data) to calculate image data subjected to the point image restoration process. That is, the point image restoration filter processing unit 200 performs deconvolution calculation of image data having a predetermined kernel size around a processing target pixel in the input image data (the same kernel size as that of the point image restoration filter such as 7×7 or 9×9) and any one of the first point image restoration filter $F_1$ and the second point image restoration filter $F_2$ to calculate the image data subjected to the point image restoration process.

The first point spread function storage unit 210 is a storage unit that stores a first point spread function (first PSF) for the visible light of the optical system (such as the lens 16).

The second point spread function storage unit 220 is a storage unit that stores a second point spread function (second PSF) for the near-infrared light of the optical system (such as the lens 16).

The point images are captured in illumination conditions with a light source including only the visible light and a light source including only the near-infrared light, and the first PSF and the second PSF are measured on the basis of image data of point images obtained at the time of the imaging, respectively. The first PSF and the second PSF are measured prior to product shipment in advance and stored in the first point spread function storage unit 210 and the second point spread function storage unit 220.

The point image restoration filter generation unit 230 reads the first PSF or the second PSF from the first point spread function storage unit 210 or the second point spread function storage unit 220, and generates any one of the first point image restoration filter $F_1$ and the second point image restoration filter $F_2$ on the basis of the read PSF.

Generally, a convolution type of Wiener filter can be used to restore the bokeh image using the PSF. Frequency characteristics $d(\omega_x, \omega_y)$ of the point image restoration filter can be calculated using the following mathematical formula by referring to information on an optical transfer function (OTF) obtained by performing Fourier transform on PSF (x, y) and a signal-to-noise ratio (SNR).

[Mathematical Formula 2]

$$d(\omega_x, \omega_y) = \frac{H^*(\omega_x, \omega_y)}{\|H(\omega_x, \omega_y)\|^2 + 1/SNR(\omega_x, \omega_y)}$$

Here, $H(\omega_x, \omega_y)$ represents OTF, and $H^*(\omega_x, \omega_y)$ represents a complex conjugate thereof. Further, $SNR(\omega_x, \omega_y)$ represents a signal-to-noise ratio.

A design of filter coefficients of the point image restoration filter is an optimization issue of selecting coefficient values such that frequency characteristics of the filter are closest to desired Wiener frequency characteristics, and the filter coefficients are appropriately calculated using an arbitrary known scheme.

The point image restoration filter may be calculated using a modulation transfer function (MTF) representing an amplitude component of the OTF in place of the OTF of Mathematical Formula 2 above.

Imaging mode information is applied from the camera controller 28 to the point image restoration filter generation unit 230. In a case where the imaging mode information indicates the visible light image capturing mode, the point image restoration filter generation unit 230 reads the first PSF from the first point spread function storage unit 210 and generates the first point image restoration filter $F_1$ on the basis of the read first PSF.

Similarly, in a case where the imaging mode information indicates the near-infrared light image capturing mode, the point image restoration filter generation unit 230 reads the second PSF from the second point spread function storage unit 220 and generates the second point image restoration filter $F_2$ on the basis of the read second PSF.

However, the point image restoration filter generation unit 230 generates the first point image restoration filter $F_1$ and the second point image restoration filter $F_2$ so that restoration strength in a case where the point image restoration process (second point image restoration process) is performed on the IR data using the second point image restoration filter $F_2$ is higher than restoration strength in a case where the point image restoration process (first point image restoration process) is performed on the luminance data Y using the first point image restoration filter $F_1$.

As an example of a method of generating a point image restoration filter having different restoration strength, appropriately adjusting a value of $1/SNR(\omega_x, \omega_y)$ in [Mathematical Formula 2] that represents the Wiener filter described above to generate the point image restoration filter is conceivable.

Since it is difficult to accurately obtain $1/SNR(\omega_x, \omega_y)$ in [Mathematical Formula 2], $1/SNR(\omega_x, \omega_y)$ approximates to a suitable constant $\Gamma$ ($1/SNR(\omega_x, \omega_y) \approx \Gamma$). In a case where a magnitude of this constant $\Gamma$ is changed, a point image restoration filter having different restoration strength can be generated, and in a case where the constant $\Gamma$ is reduced, a point image restoration filter that strengthens the restoration strength can be generated.

That is, in a case where the point image restoration filter generation unit 230 reads the second PSF from the second point spread function storage unit 220 and generates the second point image restoration filter $F_2$ on the basis of the read second PSF, which is the second point image restoration filter $F_2$ for IR data captured in a state in which the subject is irradiated with the near-infrared light from the near-infrared light emitting unit 15, the point image restoration filter generation unit 230 generates the second point image restoration filter $F_2$ using the constant $\Gamma$ approximating $1/SNR(\omega_x, \omega_y)$ in [Mathematical Formula 2] that represents a Winner filter, which has a value smaller than the constant $\Gamma$ in a case where the first point image restoration filter F1 for the luminance data Y is generated. Thus, the restoration strength in the second point image restoration process for the IR data captured in a state in which the subject is irradiated with the near-infrared light is made higher than the restoration strength in the first point image restoration process for the luminance data Y.

In a case where the second point image restoration filter $F_2$ for the IR data captured in a state in which the subject is not irradiated with the near-infrared light from the near-infrared light emitting unit 15 is generated, the second point image restoration filter $F_2$ is generated using the constant $\Gamma$ having a value greater than the constant $\Gamma$ in a case where the first point image restoration filter $F_1$ for the luminance data Y is generated. Accordingly, the restoration strength in the second point image restoration process for the IR data captured in a state in which the subject is not irradiated with the near-infrared light is made lower than the restoration strength in the first point image restoration process for the luminance data Y.

The first point image restoration filter $F_1$ or the second point image restoration filter $F_2$ generated by the point image restoration filter generation unit 230 as described above is output to the point image restoration fitter processing unit 200.

In the case of the visible light image capturing mode, the luminance data Y is input to the point image restoration filter processing unit 200, and the first point image restoration filter $F_1$ is also input from the point image restoration filter generation unit 230 to the point image restoration filter processing unit 200. The point image restoration filter processing unit 200 performs deconvolution calculation of the luminance data Y and the first point image restoration filter $F_1$ to calculate the luminance data Y subjected to the point image restoration process.

On the other hand, in the case of the near-infrared light image capturing mode, the IR data is input to the point image restoration filter processing unit 200, and the second point image restoration filter $F_2$ is also input from the point image restoration filter generation unit 230 to the point image restoration filter processing unit 200. The point image restoration filter processing unit 200 performs deconvolution calculation of the IR data and the second point image restoration filter $F_2$ to calculate the IR data subjected to the point image restoration process.

Since the PSF is changed according to imaging conditions such as the stop value (F-number), a zoom magnification, a subject distance, and an angle of view (image height), it is preferable for the first point spread function storage unit 210 and the second point spread function storage unit 220 to store a plurality of first PSFs and second PSFs according to the imaging conditions, and it is preferable for the point image restoration filter generation unit 230 to read the first PSF or the second PSF according to the imaging conditions and generate the first point image restoration filter $F_1$ or the second point image restoration filter $F_2$ on the basis of the read first PSF or the read second PSF.

<Third Embodiment of Point Image Restoration Processing Unit>

Next, a third embodiment of the point image restoration processing unit 48 illustrated in FIG. 7 will be described.

Figure 12:
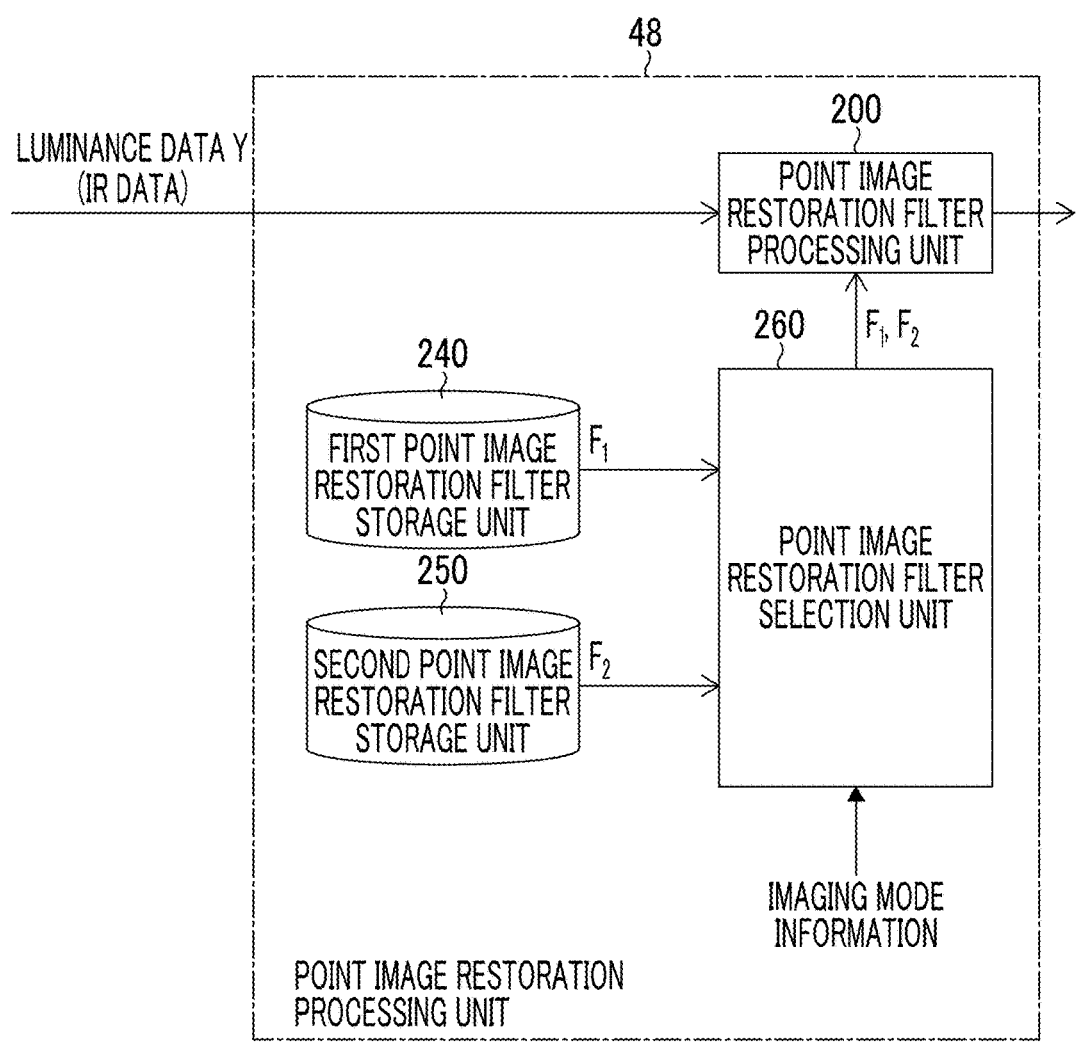
FIG. 12 is a block diagram illustrating a point image restoration processing unit according to a third embodiment.

FIG. 12 is a block diagram illustrating a point image restoration processing unit 48 of the third embodiment. The same portions as those in the second embodiment illustrated in FIG. 11 are denoted with the same reference numerals, and detailed description thereof will be omitted.

The point image restoration processing unit 48 of the third embodiment illustrated in FIG. 12 is different in that a first point image restoration filter storage unit 240 and a second point image restoration filter storage unit 250 are included in place of the first point spread function storage unit 210 and the second point spread function storage unit 220 illustrated in FIG. 11, and a point image restoration filter selection unit 260 is included in place of the point image restoration filter generation unit 230 illustrated in FIG. 11.

That is, in the third embodiment, the first point image restoration filter $F_1$ and the second point image restoration filter $F_2$ are generated on the basis of the first PSF and the second PSF in advance, the generated first point image restoration filter $F_1$ and the generated second point image restoration filter $F_2$ are stored in the first point image restoration filter storage unit 240 and the second point image restoration filter storage unit 250, respectively.

The first point image restoration filter $F_1$ and the second point image restoration filter $F_2$ are generated similar to the method generated by the point image restoration filter generation unit 230 illustrated in FIG. 11. For example, the second point image restoration filter $F_2$ for the IR data captured in a state in which the subject is irradiated with the near-infrared light from the near-infrared light emitting unit 15 is generated so that the restoration strength in the second point image restoration process using the second point image restoration filter $F_2$ for the IR data is higher than the restoration strength in the first point image restoration process using the first point image restoration filter $F_1$ for the luminance data Y.

Imaging mode information is applied from the camera controller 28 to the point image restoration filter selection unit 260. In a case where the imaging mode information indicates the visible light image capturing mode, the point image restoration filter selection unit 260 selects the first point image restoration filter $F_1$ stored in the first point image restoration filter storage unit 240, and outputs the selected first point image restoration filter $F_1$ to the point image restoration filter processing unit 200.

Similarly, in a case where the imaging mode information indicates the near-infrared light image capturing mode, the point image restoration filter selection unit 260 selects the second point image restoration filter $F_2$ stored in the second point image restoration filter storage unit 250, and outputs the selected second point image restoration filter $F_2$ to the point image restoration filter processing unit 200.

<Second Embodiment of Image Processing Device>

Figure 13:
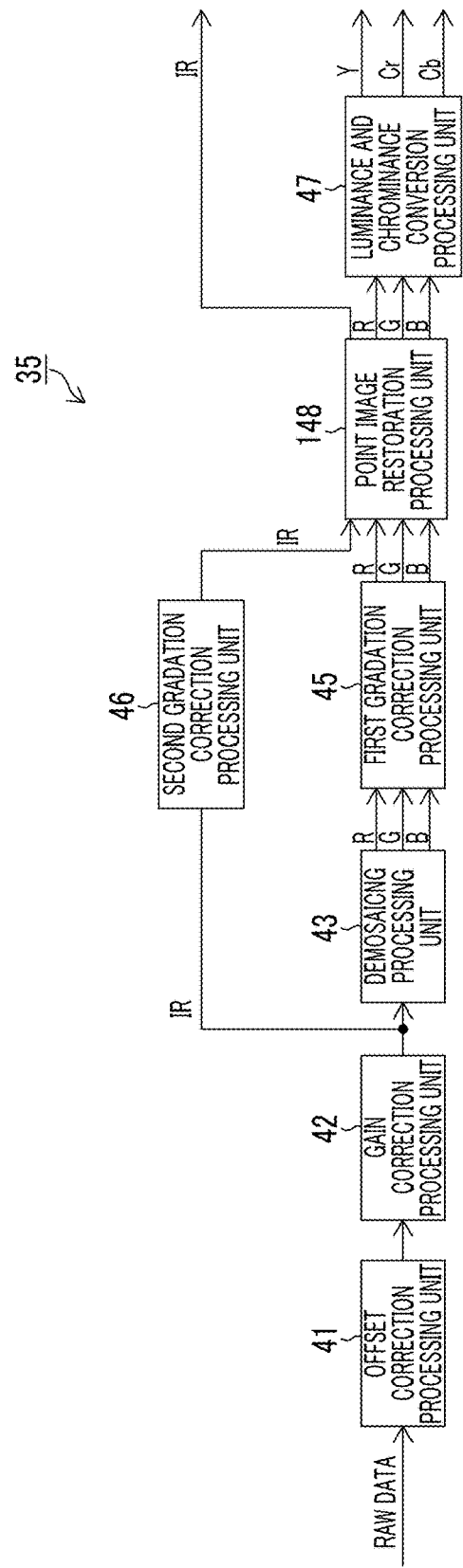
FIG. 13 is a block diagram illustrating a second embodiment of an image processing unit in a camera controller.

FIG. 13 is a block diagram illustrating a second embodiment of the image processing unit 35 in the camera controller 28 illustrated in FIG. 5. The same portions as those in the first embodiment illustrated in FIG. 7 are denoted with the same reference numerals, and detailed description thereof will be omitted.

The image processing unit 35 of the second embodiment illustrated in FIG. 13 is different in that the image processing unit 35 of the first embodiment performs the point image restoration process on the luminance data Y of the visible light image, whereas the image processing unit 35 performs the point image restoration process using the first point image restoration filter corresponding to each of pieces of the RGB data on the first color data (G data) representing the visible light image, and second color data (R data and B data) of two or more colors having a contribution rate for obtaining the luminance data lower than that of the first color data (G data).

That is, the RGB data of three surfaces of RGB subjected to gradation correction is applied from the first gradation correction processing unit 45 to the point image restoration processing unit 148 illustrated in FIG. 13 in the visible light image capturing mode, and the IR data subjected to gradation correction is applied from the second gradation correction processing unit 46 to the point image restoration processing unit 148 in the near-infrared light image capturing mode.

The point image restoration processing unit 148 performs the point image restoration process on each of pieces of RGB data using a first point image restoration filter $F_{1R}$ based on the first point spread function for the visible light (R light) of the optical system (the lens 16 or the like), a first point image restoration filter $F_{1G}$ based on the first point spread function for G light of the optical system, and a first point image restoration filter $F_{1B}$ based on the first point spread function for B light of the optical system.

Further, the point image restoration processing unit 148 performs, on the IR data, the same point image restoration process as the point image restoration process that the point image restoration processing unit 48 of the first embodiment illustrated in FIG. 7 performs on the IR data.

According to the point image restoration processing unit 148 of the second embodiment, since the point image restoration process is performed on the RGB data indicating the visible light image using the first point image restoration filters $F_{1R}$, $F_{1G}$ and $F_{1B}$ corresponding to the respective colors, it is possible to perform a high-precision point image restoration process and to perform correction of lateral chromatic aberration.

<Example of Application to EDoF System>

The point image restoration process in the above-described embodiment is image processing for restoring point spread (point image bokeh) according to specific imaging conditions (for example, n stop value, an F-number, a focal length, or image height) to an original subject image, but image processing to which the present invention is applicable is not limited to the point image restoration process in the above-described embodiment. For example, the point image restoration process according to the present invention is also applicable to a point image restoration process for image data captured and acquired by an optical system (lens or the like) having an extended depth of field (focus) (EDoF).

By performing the point image restoration process on the image data of the bokeh image that is captured and acquired in a state in which the depth of field (focal depth) is extended by the EDoF optical system, it is possible to restore the image data to high-resolution image data in a state in which a subject is focused in a wide range. In this case, a restoration process using a point image restoration filter based on a transfer function (such as a PSF, an OTF, an MTF, or a phase transfer function (PTF)) of the EDoF optical system, which is a point image restoration filter having a filter coefficient set such that good image restoration can be achieved in a range of the extended depth of field (focal depth) is performed.

Figure 14:
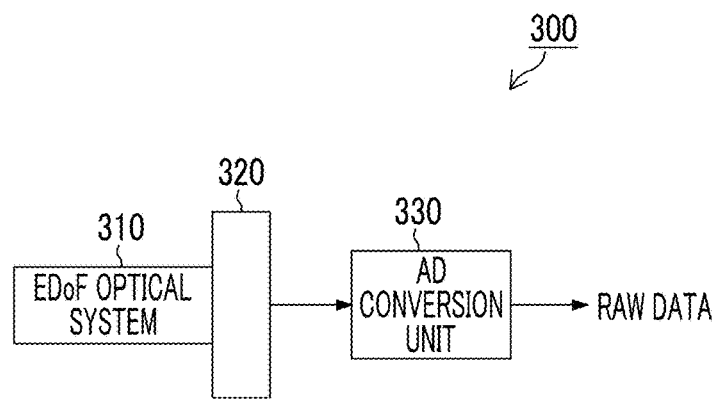
FIG. 14 is a block diagram illustrating an aspect of an imaging module including an EDoF optical system.

FIG. 14 is a block diagram illustrating an aspect of an imaging module 300 including an EDoF optical system. An imaging module (a camera head mounted on the imaging device 10) 300 of this example includes an EDoF optical system (lens unit) 310, an imaging element 320, and an AD conversion unit 330.

Figure 15:
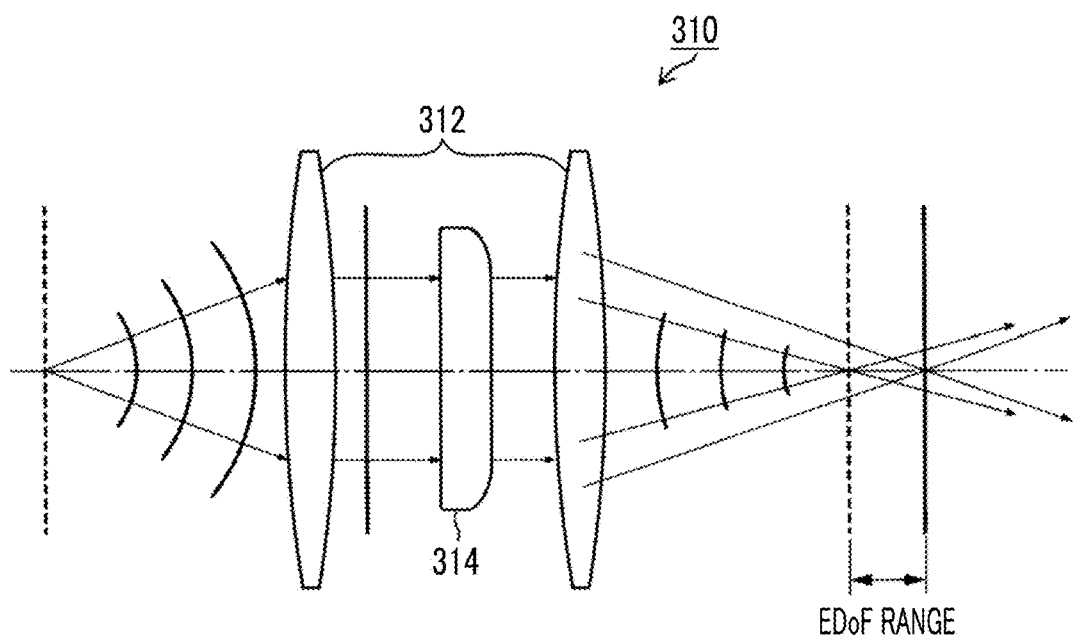
FIG. 15 is a diagram illustrating an example of an EDoF optical system.

FIG. 15 is a diagram illustrating an example of the EDoF optical system 310. The EDoF optical system 310 of this example includes a fixed lens 312 with a single focus, and an optical filter 314 disposed at a pupil position. The optical filter 314 modulates a phase and changes the EDoF optical system 310 (lens 312) to have EDoF such that the extended depth of field (focal depth) (EDoF) can be obtained. Thus, the lens 312 and the optical filter 314 constitute a lens unit that modulates the phase to extend the depth of field.

The EDoF optical system 310 includes other components, as necessary. For example, a stop (not illustrated) is disposed near the optical filter 314. Further, the optical filter 314 may be one filter or may be a combination of a plurality of filters. Further, the optical filter 314 is only one example of optical phase modulation means, and the EDoF of the EDoF optical system 310 (lens 312) may be realized by other means. For example, the EDoF of the EDoF optical system 310 may be realized by a lens 312 designed to have the same function as the optical filter 314 of this example, in place of the optical filter 314.

That is, the EDoF of the EDoF optical system 310 can be realized by a variety of means that change a wavefront of an image formed on a light reception surface of the imaging element 320. For example, "an optical element of which the thickness is changed", "an optical element of which the refractive index is changed (such as a refractive index distribution type wavefront modulation lens)", "an optical element of which the thickness or the refractive index is changed due to coding or the like on a lens surface (such as a wavefront modulation hybrid lens or an optical element formed as a phase surface on a lens surface), or "a liquid crystal element capable of modulating a phase distribution of light (such as a liquid crystal spatial phase modulation element)" can be adopted as EDoF means of the EDoF optical system 310. Thus, the present invention is applicable to not only a case where image formation regularly dispersed by an optical wavefront modulation element (optical filter 314 (phase plate)) can be performed, but also a case where a dispersed image as in a case where an optical wavefront modulation element is used can be formed by the lens 312 itself without using the optical wavefront modulation element.

The EDoF optical system 310 illustrated in FIGS. 14 and 15 can be miniaturized since a focus adjustment mechanism that mechanically performs focus adjustment can be omitted. A mechanism (not illustrated) that loads and unloads the infrared cut filter is provided in the optical path of the EDoF optical system 310 or between the EDoF optical system 310 and the imaging element 320, similar to the imaging device 10 illustrated in FIG. 1.

The optical image passed through the EDoF optical system 310 having the EDoF is formed on the imaging element 320 illustrated in FIG. 14 and is converted into an electric signal in the imaging element 320.

As the imaging element 320, the same imaging element as the imaging element 26 illustrated in FIG. 1 can be applied. The AD (Analog-to-Digital) conversion unit 330 converts an analog RGB signal output for each pixel from the imaging element 320 into a digital RGB signal. The digital image signal converted by the AD conversion unit 330 is output as RAW data.

By applying the image processing unit (image processing device) 35 illustrated in FIGS. 7 and 13 to the RAW data that is output from the imaging module 300, it is possible to generate image data indicating the visible light image and the near-infrared light image with a high resolution in a state in which a subject is focused is in a wide range.

Figure 16:
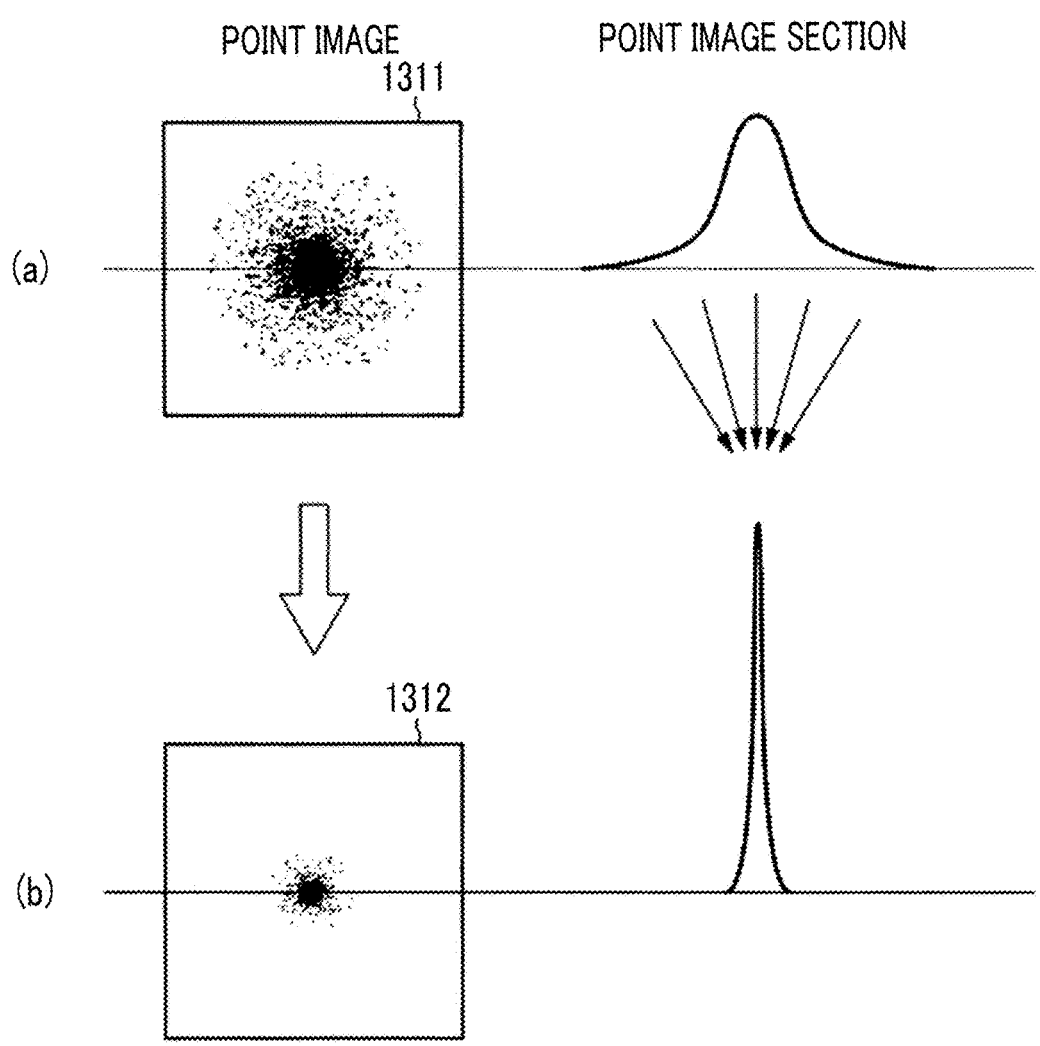
FIG. 16 is a diagram illustrating a restoration example of an image acquired via an EDoF optical system.

That is, a point image (optical image) after passing through the EDoF optical system 310 is formed as a large point image (bokeh image) on the imaging element 320 as indicated by reference numeral 1311 in FIG. 16, but is restored to a small point image (high-resolution image), as illustrated by reference numeral 1312 in FIG. 16, through the point image restoration process in the point image restoration processing unit 48 or the point image restoration processing unit 148 of the image processing unit (image processing device) 35.

Further, the aspect to which the present invention is applicable is not limited to the surveillance camera or the digital camera, and is also applicable to mobile devices having functions (a calling function, a communication function, and other computer functions) other than imaging in addition to the imaging function, in addition to a camera having imaging as a main function. Other aspects to which the present invention is applicable may include, for example, a mobile phone or a smart phone, personal digital assistants (PDA), and a portable game machine having a camera function.

[Others]

Although the aspect in which the image processing unit (image processing device) 35 is provided in the imaging device 10 (camera controller 28) has been described in each of the above-described embodiments, the image processing unit (image processing device) 35 may be provided in another device such as the computer 60 or the server 80.

For example, in a case where the image data is processed in the computer 60, the point image restoration process of the image data may be performed by the image processing unit (image processing device) 35 provided in the computer 60. Further, in a case where the server 80 includes the image processing unit (image processing device) 35, for example, the image data may be transmitted from the imaging device 10 or the computer 60 to the server 80, the point image restoration process may be performed on the image data in the image processing unit (image processing device) 35 of the server 80, and the image data after the point image restoration process may be transmitted or provided to a transmission source.

Each of the functional configurations described above can be appropriately realized by arbitrary hardware, arbitrary software, or a combination of both. For example, the present invention is applicable to an image processing program that causes a computer to execute the image processing method (image processing procedure) in each device and the processing units (camera controller 28, the device control unit 34, and the image processing unit 35) described above, a computer-readable recording medium (non-transitory recording medium) having the image processing program recorded thereon, or a computer in which the image processing program can be installed.

Further, the filter device 24 of the imaging device 10 illustrated in FIGS. 1 and 2 may insert dummy glass into the imaging optical path in a case where retracting the infrared cut filter 20. Dummy glass having the same refractive index and thickness as the infrared cut filter 20 is preferably used.

Accordingly, the focal position can be prevented from being changed in a case where switching from the infrared cut filter 20 to the dummy glass occurs.

Further, in the imaging device 10, an imaging element including a pixel for capturing a visible light image and a pixel for capturing a near-infrared light image without providing the filter device 24 may be used.

Further, the present invention is not limited to the above-described embodiments and it is understood that various modifications can be made without departing from the spirit of the present invention.

EXPLANATION OF REFERENCES

10: imaging device
12: lens unit (optical system)
15: near-infrared light emitting unit
16, 312: lens
18: optical system operation unit
20: infrared cut filter
24: filter device
26, 320: imaging element
28: camera controller
32: input and output interface
34: device control unit
35: image processing unit
41: offset correction processing unit
42: gain correction processing unit
43: demosaicing processing unit
45: first gradation correction processing unit
46: second gradation correction processing unit
47: luminance and chrominance conversion processing unit
48, 100, 148: point image restoration processing unit
110: first point image restoration filter processing unit
112, 122: multiplier
120: second point image restoration filter processing unit
130: changeover switch
140: adder
150: restoration rate control unit
160: discrimination unit
200: point image restoration filter processing unit
210: first point spread function storage unit
220: second point spread function storage unit
230: point image restoration filter generation unit
240: first point image restoration filter storage unit
250: second point image restoration filter storage unit
260: point image restoration filter selection unit
300: imaging module
310: EDoF optical system
314: optical filter

What is claimed is:

1. An image processing device, comprising:
an image acquisition unit that acquires first image data indicating a visible light image captured with sensitivity to a visible light wavelength band using an optical system, and second image data including a near-infrared light image captured with sensitivity to the visible light wavelength band and a near-infrared light wavelength band using the optical system;
a first point image restoration processing unit that performs a first point image restoration process on the acquired first image data using a first point image restoration filter based on a first point spread function with respect to visible light of the optical system; and
a second point image restoration processing unit that performs a second point image restoration process on the acquired second image data using a second point image restoration filter based on a second point spread function with respect to near-infrared light of the optical system, the second point image restoration processing unit causing restoration strength in the second point image restoration process for the second image data captured with radiation of near-infrared light to be higher than restoration strength in the first point image restoration process performed by the first point image restoration processing unit.

2. The image processing device according to claim 1, wherein the second point image restoration processing unit causes the restoration strength in the second point image restoration process for the second image data captured without radiation of near-infrared light to be lower than the restoration strength in the first point image restoration process for the first image data that is performed by the first point image restoration processing unit.

3. The image processing device according to claim 2, further comprising:
a discrimination unit that discriminates whether or not the acquired second image data is the second image data that has been captured without radiation of the near-infrared light from the near-infrared light emitting unit and captured under a light source in which visible light and near-infrared light coexist,
wherein in a case where the discrimination unit discriminates that the acquired second image data is the second image data that has been captured without radiation of the near-infrared light and includes a visible light component and a near-infrared light component, the second point image restoration processing unit causes the restoration strength in the second point image restoration process to be higher than the restoration strength in the second point image restoration process for the second image data captured without radiation of the near-infrared light and not including a visible light component.

4. The image processing device according to claim 1, wherein:
the second point image restoration processing unit includes a restoration rate control unit that adjusts a restoration rate of the second image data in the second point image restoration process; and
the restoration rate control unit causes a restoration rate of the second image data captured with radiation of near-infrared light to be higher than a restoration rate of the first image data in the first point image restoration process.

5. The image processing device according to claim 1, wherein:
the second point image restoration processing unit includes a restoration rate control unit that adjusts a restoration rate of the second image data in the second point image restoration process; and
the restoration rate control unit causes a restoration rate of the second image data captured without radiation of near-infrared light to be smaller than a restoration rate of the first image data in the first point image restoration process.

6. The image processing device according to claim 1, wherein:
the first image data includes first color data, and second color data of two or more colors having a contribution rate for obtaining luminance data lower than that of the first color data; and the first point image restoration processing unit performs a first point image restoration process on luminance data generated from the first image data using the first point image restoration filter corresponding to the luminance data.

7. The image processing device according to claim 1, wherein:
the first image data includes first color data, and each of pieces of second color data of two or more colors having a contribution rate for obtaining luminance data lower than that of the first color data; and
the first point image restoration processing unit performs a first point image restoration process on the first color data and each of pieces of the second color data of two or more colors using the first point image restoration filter corresponding to the first color data and each of pieces of second color data of two or more colors.

8. An imaging device, comprising:
the image processing device according to claim 1; and
an optical system in which an infrared cut filter is insertable into an imaging optical path and retractable from the imaging optical path, wherein:
the image acquisition unit is an imaging unit that images a subject to acquire first image data indicating a visible light image of the subject using the optical system in which the infrared cut filter has been inserted into the imaging optical path and images the subject to acquire second image data indicating a near-infrared light image of the subject using the optical system in which the infrared cut filter has been retracted from the imaging optical path; and
the imaging unit includes a focus adjustment unit that adjusts a focus position of the subject in the optical system, the focus adjustment unit adjusting the focus position for the subject imaged using the optical system in which the infrared cut filter has been inserted into the imaging optical path.

9. The imaging device according to claim 8, further comprising a near-infrared light emitting unit that emits near-infrared light as auxiliary light at the time of imaging of a near-infrared light image.

10. An image processing device, comprising:
an image acquisition unit that acquires first image data captured using an optical system in which an infrared cut filter has been inserted into an imaging optical path, and second image data captured using the optical system in which the infrared cut filter has been retracted from the imaging optical path;
a first point image restoration processing unit that performs a first point image restoration process on the acquired first image data using a first point image restoration filter based on a first point spread function with respect to visible light of the optical system; and
a second point image restoration processing unit that performs a second point image restoration process on the acquired second image data using a second point image restoration filter based on a second point spread function with respect to near-infrared light of the optical system, the second point image restoration processing unit causing restoration strength in the second point image restoration process for the second image data captured with radiation of near-infrared light to be higher than restoration strength in the first point image restoration process performed by the first point image restoration processing unit.

11. The image processing device according to claim 10, wherein the second point image restoration processing unit causes the restoration strength in the second point image restoration process for the second image data captured without radiation of near-infrared light to be lower than the restoration strength in the first point image restoration process for the first image data that is performed by the first point image restoration processing unit.

12. The image processing device according to claim 11, further comprising:
a discrimination unit that discriminates whether or not the acquired second image data is the second image data that has been captured without radiation of the near-infrared light from the near-infrared light emitting unit and captured under a light source in which visible light and near-infrared light coexist,
wherein in a case where the discrimination unit discriminates that the acquired second image data is the second image data that has been captured without radiation of the near-infrared light and includes a visible light component and a near-infrared light component, the second point image restoration processing unit causes the restoration strength in the second point image restoration process to be higher than the restoration strength in the second point image restoration process for the second image data captured without radiation of the near-infrared light and not including a visible light component.

13. The image processing device according to claim 10, wherein:
the second point image restoration processing unit includes a restoration rate control unit that adjusts a restoration rate of the second image data in the second point image restoration process; and
the restoration rate control unit causes a restoration rate of the second image data captured with radiation of near-infrared light to be higher than a restoration rate of the first image data in the first point image restoration process.

14. The image processing device according to claim 10, wherein:
the second point image restoration processing unit includes a restoration rate control unit that adjusts a restoration rate of the second image data in the second point image restoration process; and
the restoration rate control unit causes a restoration rate of the second image data captured without radiation of near-infrared light to be smaller than a restoration rate of the first image data in the first point image restoration process.

15. The image processing device according to claim 10, wherein:
the first image data includes first color data, and second color data of two or more colors having a contribution rate for obtaining luminance data lower than that of the first color data; and
the first point image restoration processing unit performs a first point image restoration process on luminance data generated from the first image data using the first point image restoration filter corresponding to the luminance data.

16. The image processing device according to claim 10, wherein:
the first image data includes first color data, and each of pieces of second color data of two or more colors having a contribution rate for obtaining luminance data lower than that of the first color data; and
the first point image restoration processing unit performs a first point image restoration process on the first color data and each of pieces of the second color data of two or more colors using the first point image restoration filter corresponding to the first color data and each of pieces of second color data of two or more colors.

17. An image processing method, comprising:
a step of acquiring first image data indicating a visible light image captured with sensitivity to a visible light wavelength band using an optical system, and second image data including a near-infrared light image captured with sensitivity to the visible light wavelength band and a near-infrared light wavelength band using the optical system;
a step of performing a first point image restoration process on the acquired first image data using a first point image restoration filter based on a first point spread function with respect to visible light of the optical system; and
a step of performing a second point image restoration process on the acquired second image data using a second point image restoration filter based on a second point spread function with respect to near-infrared light of the optical system, the step including causing restoration strength in the second point image restoration process for the second image data captured with radiation of near-infrared light to be higher than restoration strength in the first point image restoration process.

18. The image processing method according to claim 17, wherein the step of performing the second point image restoration process includes causing the restoration strength in the second point image restoration process for the second image data captured without radiation of near-infrared light to be lower than the restoration strength in the first point image restoration process for the first image data.

19. A non-transitory computer-readable tangible medium containing an image processing program that causes a computer to execute:
a step of acquiring first image data indicating a visible light image captured with sensitivity to a visible light wavelength band using an optical system, and second image data including a near-infrared light image captured with sensitivity to the visible light wavelength band and a near-infrared light wavelength band using the optical system;
a step of performing a first point image restoration process on the acquired first image data using a first point image restoration filter based on a first point spread function with respect to visible light of the optical system; and
a step of performing a second point image restoration process on the acquired second image data using a second point image restoration filter based on a second point spread function with respect to near-infrared light of the optical system, the step including causing restoration strength in the second point image restoration process for the second image data captured with radiation of near-infrared light to be higher than restoration strength in the first point image restoration process.

20. The non-transitory computer-readable tangible medium according to claim 19, wherein the step of performing the second point image restoration process includes causing the restoration strength in the second point image restoration process for the second image data captured without radiation of near-infrared light to be lower than the restoration strength in the first point image restoration process for the first image data.

* * * * *